US012672088B2

(12) United States Patent
Dong

(10) Patent No.: US 12,672,088 B2
(45) Date of Patent: Jun. 30, 2026

(54) TERMINAL POSITIONING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 433 days.

(21) Appl. No.: 18/026,811

(22) PCT Filed: Sep. 18, 2020

(86) PCT No.: PCT/CN2020/116222
§ 371 (c)(1),
(2) Date: Mar. 16, 2023

(87) PCT Pub. No.: WO2022/056847
PCT Pub. Date: Mar. 24, 2022

(65) Prior Publication Data
US 2023/0328681 A1 Oct. 12, 2023

(51) Int. Cl.
*H04W 64/00* (2009.01)
*H04W 76/20* (2018.01)

(52) U.S. Cl.
CPC ........... *H04W 64/00* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 2020/0053690 A1 | 2/2020 | Fischer et al. | |
| 2022/0368496 A1* | 11/2022 | Shreevastav | .......... H04L 5/0094 |
| 2023/0199522 A1* | 6/2023 | Manolakos | ........... H04W 64/00 455/456.1 |
| 2023/0362699 A1* | 11/2023 | Yerramalli | ............ H04W 24/10 |

FOREIGN PATENT DOCUMENTS

| | | |
|---|---|---|
| CN | 106341882 A | 1/2017 |
| CN | 111356075 A | 6/2020 |
| WO | 2020033614 A1 | 2/2020 |

OTHER PUBLICATIONS

International Search Report issued in Application No. PCT/CN2020/116222, dated Jun. 18, 2021, (4p).
Intel Corporation et al. "Running CR for the introduction of NR positioning", 3GPP, TSG-RAN WG2 Meeting #109 electronic R2-2001934, Mar. 6, 2020, (64p).
3GPP. "NG Radio Access Network (NG-RAN); Stage 2 functional specification of User Equipment (UE) positioning in NG-RAN (Release 16)", 3GPP TS 38.305 V16.0.0, Mar. 30, 2020, (107p).

* cited by examiner

*Primary Examiner* — Suhail Khan
(74) *Attorney, Agent, or Firm* — Arch & Lake LLP; Hao Tan; Shen Wang

(57) ABSTRACT
Terminal positioning methods and communication devices are provided. In one terminal positioning method, a core network element sends a first message to be used by a terminal to perform terminal positioning, where the first message includes auxiliary positioning information and location request information, the auxiliary positioning information is used by the terminal to perform positioning measurement, and the location request information is used to request and acquire a positioning result of the positioning measurement.

18 Claims, 16 Drawing Sheets

| Terminal | Base station | Location management function |
|---|---|---|

Step a, send auxiliary positioning information by a location management function (LMF) through a long-term evolution (LTE) positioning protocol (LPP) message Step b, send location request information by the location management function (LMF) through a long-term evolution (LTE) positioning protocol (LPP) message Step c, request a measurement gap by a terminal from a base station Step d, configure the requested measurement gap by the base station for the terminal and send the requested measurement gap to the terminal Step e, measure a positioning reference signal (PRS) by the terminal by using information such as the measurement gap to obtain a measurement result of positioning measurement Step f, send the measurement result by the terminal to the location management function (LMF) through a long-term evolution (LTE) positioning protocol (LPP) message

Fig. 3

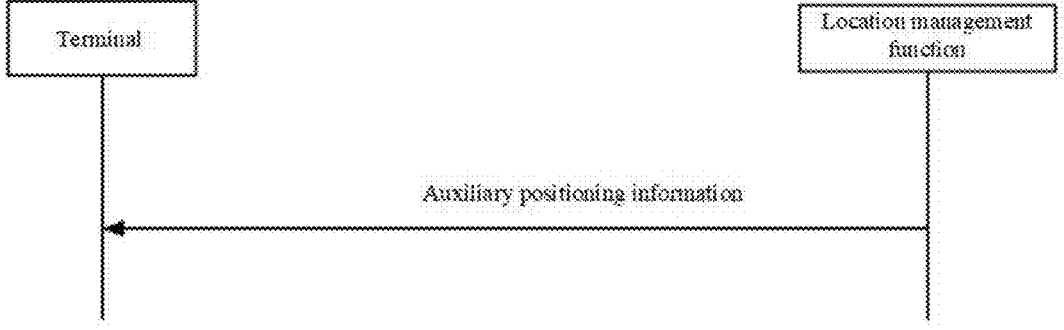

| Terminal | | Location management function |
|---|---|---|

Auxiliary positioning information

Fig. 4

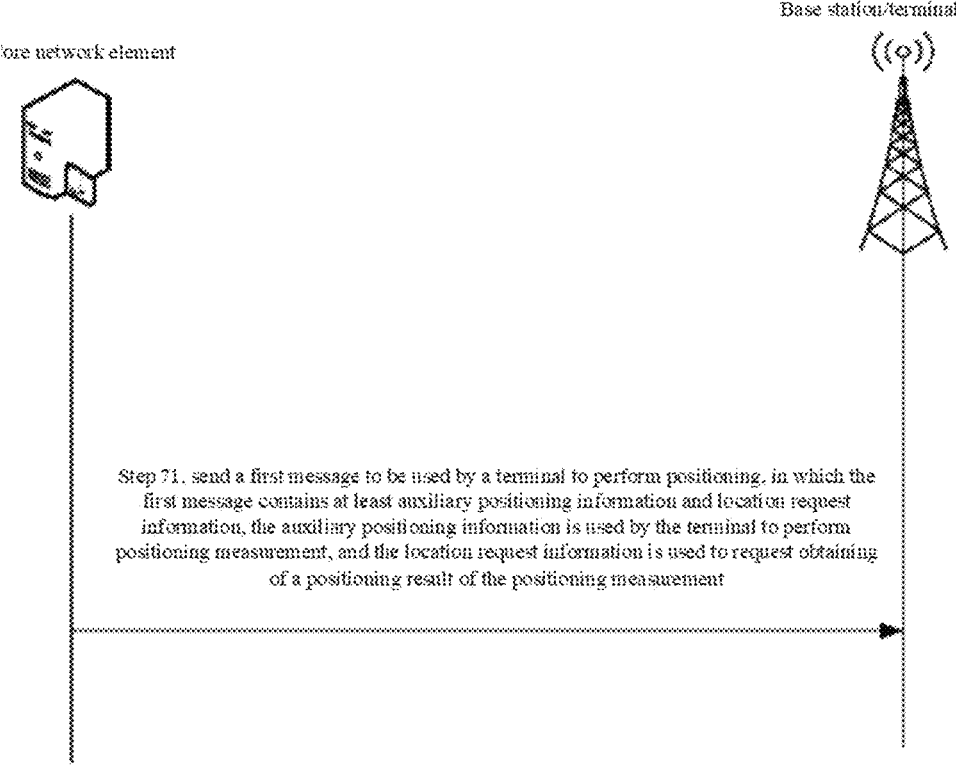

Core network element

Base station/terminal

Step 71. send a first message to be used by a terminal to perform positioning, in which the first message contains at least auxiliary positioning information and location request information, the auxiliary positioning information is used by the terminal to perform positioning measurement, and the location request information is used to request obtaining of a positioning result of the positioning measurement

Fig. 7

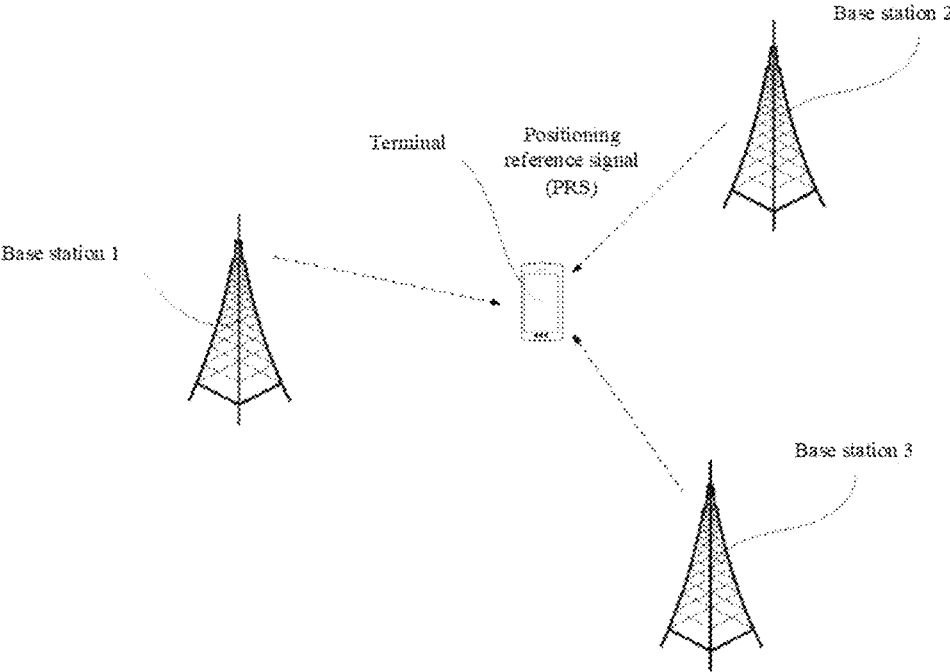

Base station 2

Terminal    Positioning reference signal (PRS)

Base station 1

Base station 3

Fig. 8

Core network element

Base station

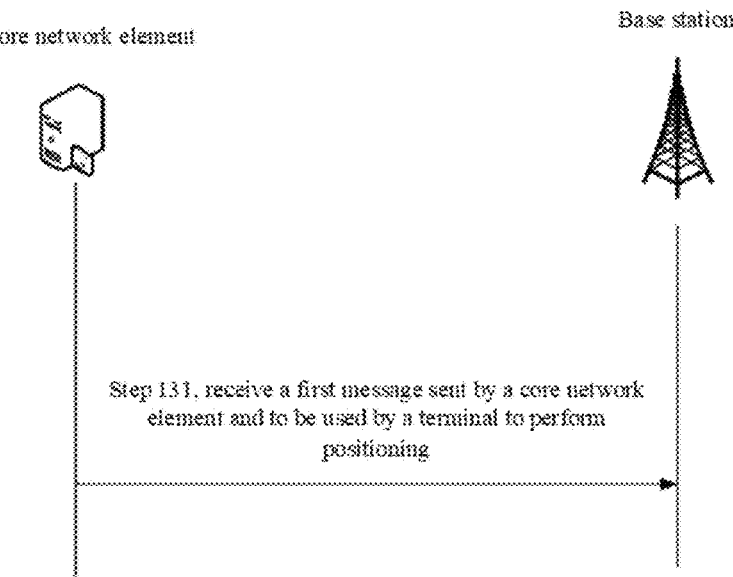

Step 131, receive a first message sent by a core network element and to be used by a terminal to perform positioning

Fig. 13

Core network element

Base station

Terminal

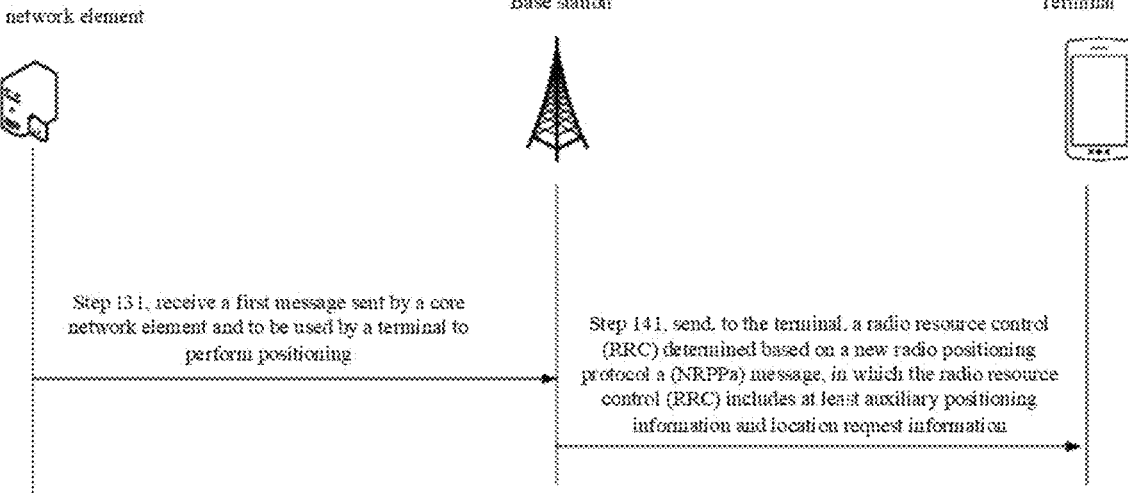

Step 131, receive a first message sent by a core network element and to be used by a terminal to perform positioning Step 141, send, to the terminal, a radio resource control (RRC) determined based on a new radio positioning protocol a (NRPPa) message, in which the radio resource control (RRC) includes at least auxiliary positioning information and location request information

Fig. 14

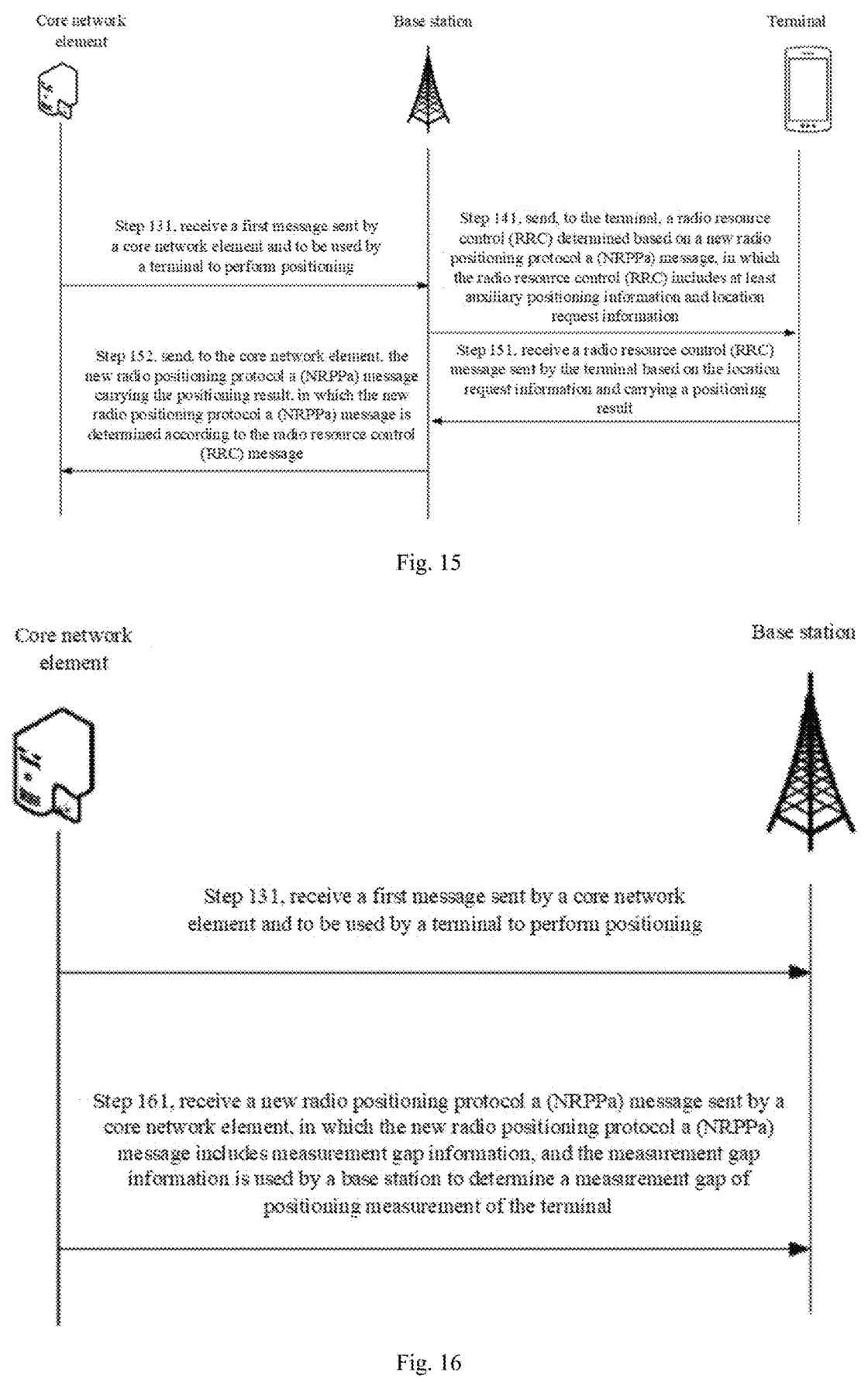

Core network element

Base station

Terminal

Step 131, receive a first message sent by a core network element and to be used by a terminal to perform positioning Step 141, send, to the terminal, a radio resource control (RRC) determined based on a new radio positioning protocol a (NRPPa) message, in which the radio resource control (RRC) includes at least auxiliary positioning information and location request information Step 152, send, to the core network element, the new radio positioning protocol a (NRPPa) message carrying the positioning result, in which the new radio positioning protocol a (NRPPa) message is determined according to the radio resource control (RRC) message Step 151, receive a radio resource control (RRC) message sent by the terminal based on the location request information and carrying a positioning result

Fig. 15

Core network element

Base station

Step 131, receive a first message sent by a core network element and to be used by a terminal to perform positioning Step 161, receive a new radio positioning protocol a (NRPPa) message sent by a core network element, in which the new radio positioning protocol a (NRPPa) message includes measurement gap information, and the measurement gap information is used by a base station to determine a measurement gap of positioning measurement of the terminal

Fig. 16

Core network
element/base station

Terminal

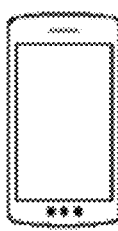

Step 171, receive a positioning message, in which the positioning
message contains at least auxiliary positioning information and
location request information, the auxiliary positioning
information is used by a terminal to perform positioning
measurement, and the location request information is used to
request obtaining of a positioning result of the positioning
measurement

Fig. 17

Base station                                      Terminal

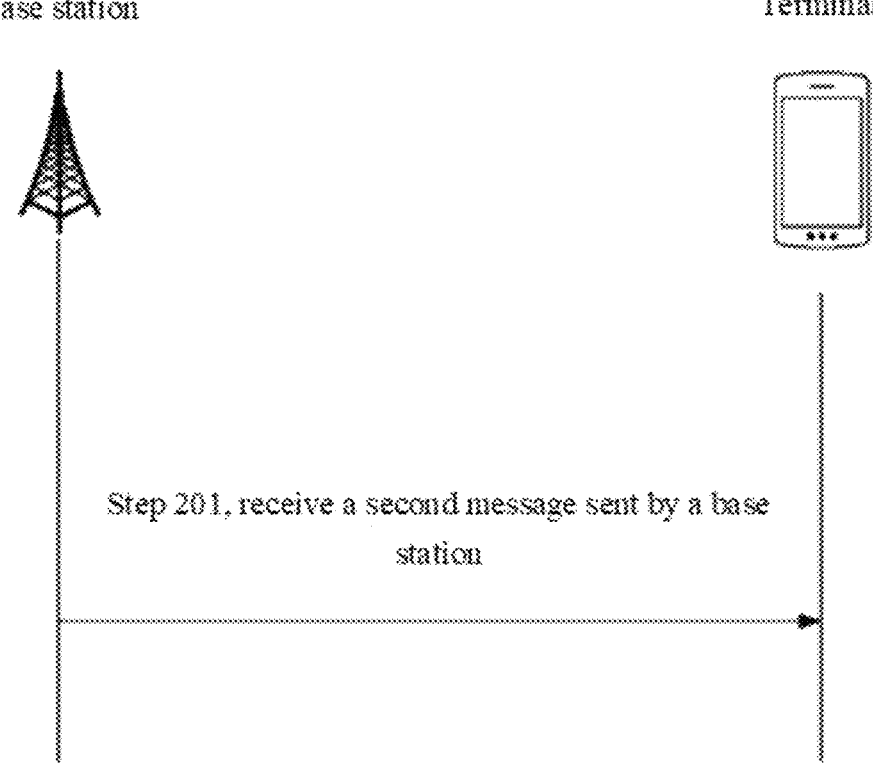

Step 201, receive a second message sent by a base station

Fig. 20

Core network element/ base station                     Terminal

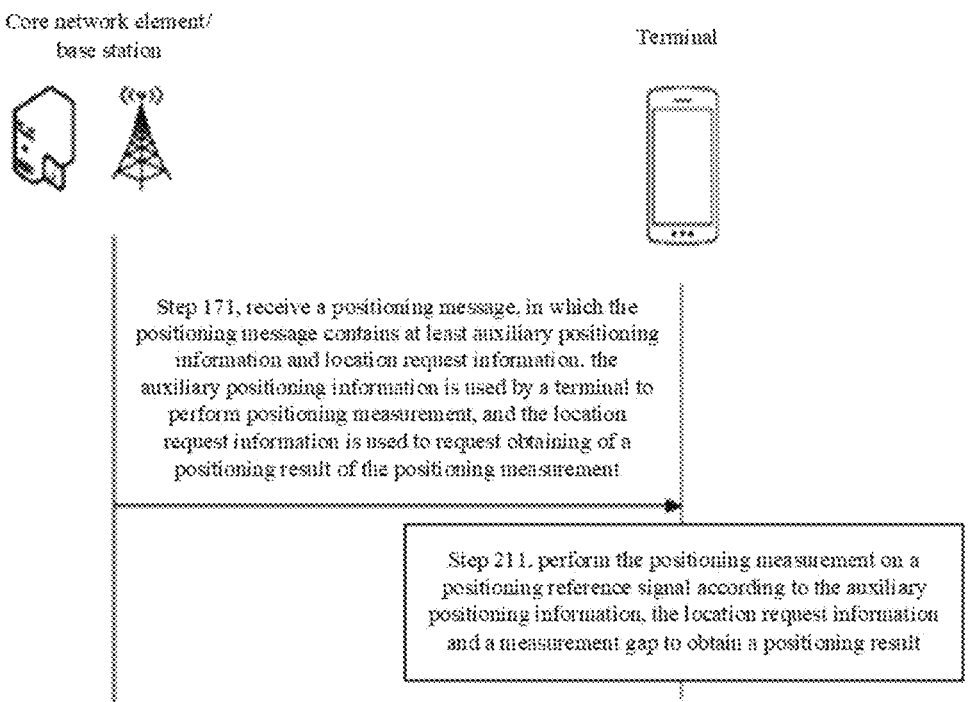

Step 171, receive a positioning message, in which the positioning message contains at least auxiliary positioning information and location request information, the auxiliary positioning information is used by a terminal to perform positioning measurement, and the location request information is used to request obtaining of a positioning result of the positioning measurement Step 211, perform the positioning measurement on a positioning reference signal according to the auxiliary positioning information, the location request information and a measurement gap to obtain a positioning result

Fig. 21

Core network
element/base station

 

Terminal

Step 171, receive a positioning message, in which the
positioning message contains at least auxiliary positioning
information and location request information, the auxiliary
positioning information is used by a terminal to perform
positioning measurement, and the location request
information is used to request obtaining of a positioning result
of the positioning measurement Step 222, send, to a base station, a radio resource control
(RRC) message carrying the positioning result based on the
location request information; or, send, to a core network
element, a long-term evolution positioning protocol (LPP)
message carrying the positioning result based on the location
request information

Fig. 22

Terminal positioning apparatus

First sending module

TERMINAL POSITIONING METHOD AND APPARATUS, COMMUNICATION DEVICE, AND STORAGE MEDIUM

CROSS-REFERENCE TO RELATED APPLICATION

The present application is the U.S. National Stage of International Application No. PCT/CN2020/116222, filed on Sep. 18, 2020, the contents of all of which are incorporated herein by reference in their entireties for all purposes.

BACKGROUND

A release 16 (R16) of 5th generation mobile networks (5G) introduces a variety of terminal positioning technologies, all of which can implement terminal positioning. When a network needs to perform positioning on a terminal, a location management function (LMF) will send a positioning request to the terminal. After the terminal receives the positioning request, positioning measurement of the terminal is completed according to information in the positioning request, and a positioning measurement result or location information of the terminal is reported, so a positioning process of the terminal is completed.

SUMMARY

The disclosure relates to, but is not limited to, the technical field of wireless communication, in particular to a terminal positioning method and apparatus, a communication device, and a storage medium.

According to a first aspect of the disclosure, a terminal positioning method is provided. The terminal positioning method includes that a core network element sends a first message to be used by a terminal to perform positioning. Furthermore, the first message includes auxiliary positioning information and location request information, the auxiliary positioning information is used by the terminal to perform positioning measurement, and the location request information is used to request obtaining of a positioning result of the positioning measurement.

According to a second aspect of the disclosure, a terminal positioning method is provided. The terminal positioning method includes that a base station receives a first message sent by a core network element and to be used by a terminal to perform positioning. Furthermore, the first message includes auxiliary positioning information and location request information, the auxiliary positioning information is used by the terminal to perform positioning measurement, and the location request information is used to request obtaining of a positioning result of the positioning measurement.

According to a third aspect of the disclosure, a terminal positioning method is provided. The terminal positioning method includes that a terminal receiving a positioning message. Furthermore, the positioning message includes auxiliary positioning information and location request information, the auxiliary positioning information is used by the terminal to perform positioning measurement, and the location request information is used to request obtaining of a positioning result of the positioning measurement.

According to a fourth aspect of the disclosure, a communication device is provided. The communication device includes an antenna, a memory, and a processor connected with the antenna and the memory respectively and configured to, by executing an executable program stored on the memory, control the antenna to send and receive a wireless signal and be capable of executing steps of the method according to the first, second, or third aspect above.

According to a fifth aspect of an example of the disclosure, a non-transitory computer readable storage medium is further provided and stores computer executable instructions, in which the computer executable instructions, after being executed by a processor, can implements steps of the method according to the first, second, or third aspect above.

BRIEF DESCRIPTION OF THE DRAWINGS

FIG. 3 is a schematic diagram of a method for positioning a terminal provided by an example of the disclosure.

FIG. 4 is a schematic diagram of a method for positioning a terminal provided by an example of the disclosure.

FIG. 7 is a schematic diagram of a method for positioning a terminal provided by an example of the disclosure.

FIG. 8 is a schematic diagram of a method for positioning a terminal provided by an example of the disclosure.

FIG. 13 is a schematic diagram of a method for positioning a terminal provided by an example of the disclosure.

FIG. 14 is a schematic diagram of a method for positioning a terminal provided by an example of the disclosure.

FIG. 15 is a schematic diagram of a method for positioning a terminal provided by an example of the disclosure.

FIG. 16 is a schematic diagram of a method for positioning a terminal provided by an example of the disclosure.

FIG. 17 is a schematic diagram of a method of positioning a terminal provided by an example of the disclosure.

FIG. 20 is a schematic diagram of a method for positioning a terminal provided by an example of the disclosure.

FIG. 21 is a schematic diagram of a method for positioning a terminal provided by an example of the disclosure.

FIG. 22 is a schematic diagram of a method for positioning a terminal provided by an example of the disclosure.

FIG. 23 is a schematic diagram of an apparatus for positioning a terminal provided by an example of the disclosure.

3

Figure 26:
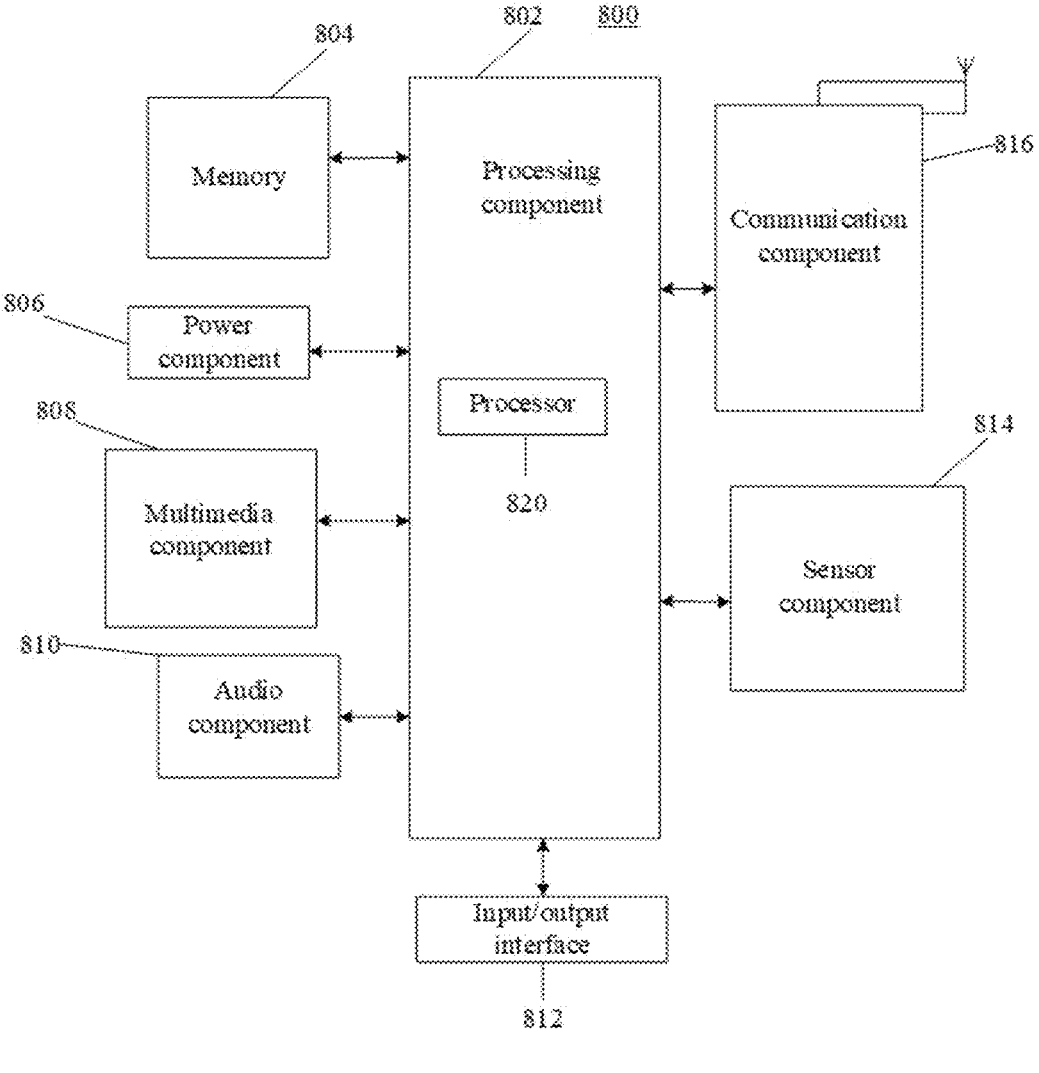

FIG. 26 is a schematic structural diagram of a terminal provided by an example of the disclosure.

Figure 27:
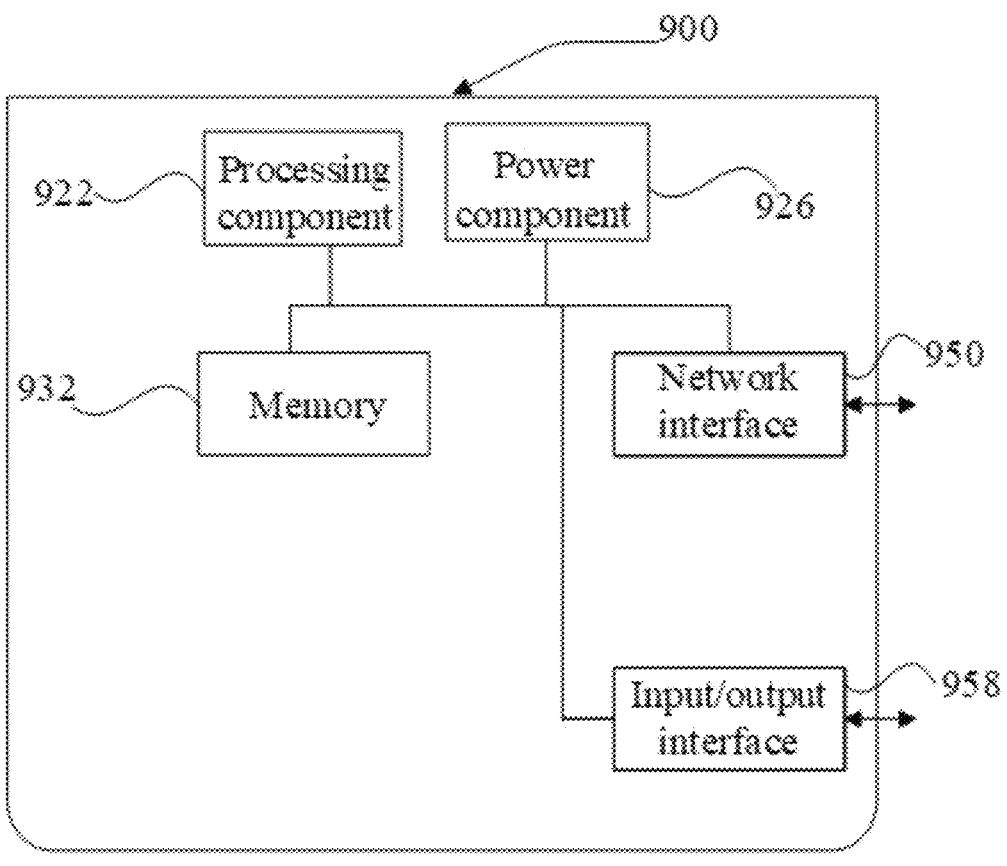

FIG. 27 is a schematic structural diagram of a base station provided by an example of the disclosure.

DETAILED DESCRIPTION

The examples will be described in detail here, and their instances are represented in the accompanying drawings. Unless otherwise indicated, when the following description refers to the accompanying drawings, the same number in the different accompanying drawings represents the same or similar element. Implementations described in the following examples do not represent all implementations consistent with the examples of the disclosure. Rather, they are merely examples of an apparatus and method consistent with some aspects of the examples of the disclosure as detailed in appended claims.

Terms used in the examples of the disclosure are merely intended to describe specific examples instead of limiting the examples of the disclosure. The singular forms such as "a/an" and "the" used in the examples of the disclosure and the appended claims also intend to include plural forms unless other meanings are clearly indicated in context. It should be further understood that a term "and/or" used here refers to and contains any one or all possible combinations of one or more associated listed items.

It should be understood that although various pieces of information are possibly described by using terms such as first, second and third in the examples of the disclosure, they are not supposed to be limited to these terms. These terms are merely used for distinguishing information of the same type. For example, without departing from the scope of the examples of the disclosure, first information may also be called second information, and similarly, the second information may also be called the first information. Depending on the context, words "if" and "in case" used here may be constructed as "during . . . ," "when . . . ," or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the related art, during positioning of the terminal, an end-to-end delay is about 50 milliseconds. In release 17 (R17) of the 5th generation mobile networks (5G), a demand of 10 milliseconds of the end-to-end delay is proposed. Thus, the delay of a terminal positioning technology needs to be further shortened so as to meet a demand of a service, and user experience is improved.

Examples of the disclosure disclose a terminal positioning method and apparatus, a communication device, and a storage medium.

4

Figure 1:
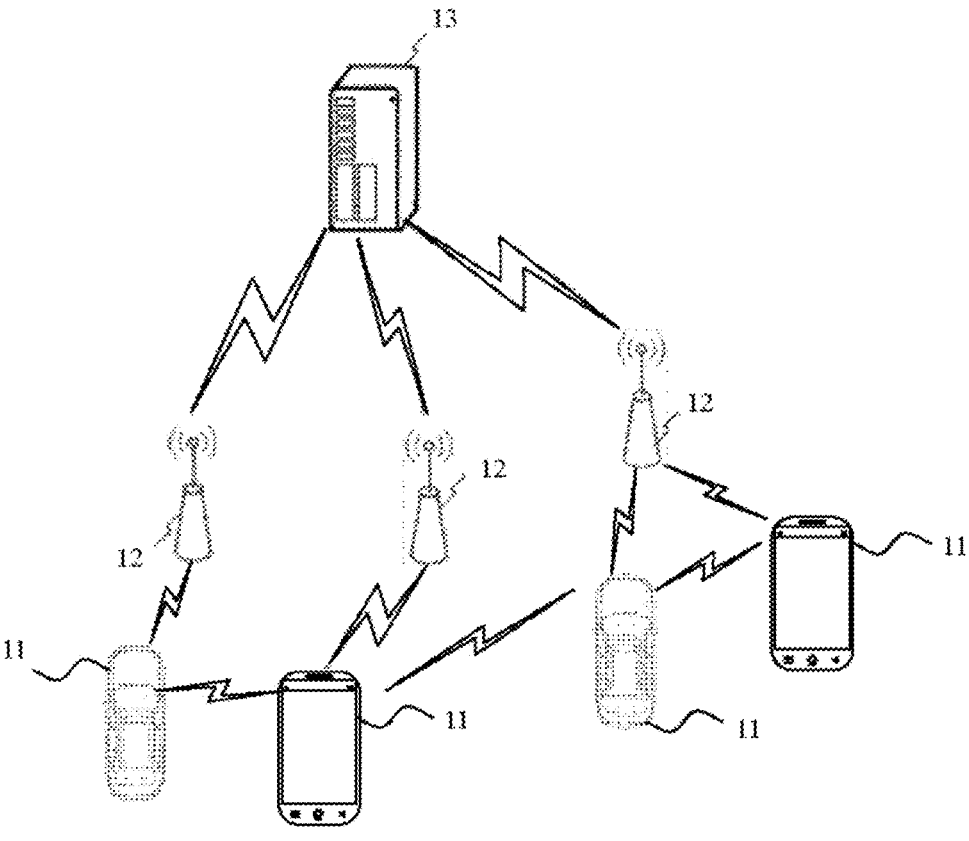
FIG. 1 is a schematic structural diagram of a wireless communication system provided by an example of the disclosure.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of terminals 11 and a plurality of base stations 12.

The terminal 11 may refer to a device providing a voice and/or data connectivity for a user. The terminal 11 may communicate with one or more core networks via a radio access network (RAN), the terminal 11 may be an Internet of Things terminal, such as a sensor device, a mobile phone (or called a "cell" phone) and a computer with the Internet of Things terminal, for example, the terminal may be a fixed, portable, pocket, hand-held, computer built-in or vehicle-mounted apparatus. For example, the terminal may be a station (STA), a subscriber unit, a subscriber station, a mobile station, a mobile, a remote station, an access point, a remote terminal, an access terminal, a user terminal, a user agent, a user device, or user equipment (UE). Or the terminal 11 may also be a device of an unmanned aerial vehicle. Or the terminal 11 may also be a vehicle-mounted device, for example, may be a trip computer with a wireless communication function, or a wireless communication device externally connected with the trip computer. Or the terminal 11 may also be a road-side infrastructure, for example, may be a street lamp, signal lamp or other road-side infrastructures with a wireless communication function.

The base station 12 may be a network side device in the wireless communication system. The wireless communication system may be the 4th generation mobile communication (4G) system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN). Or the wireless communication system is an MTC system.

The base station 12 may be an evolution base station (eNB) adopted in the 4G system. Or the base station 12 may also be a base station (gNB) adopting a centralized distributed architecture in the 5G system. When adopting the centralized distributed architecture, the base station 12 usually includes a central unit (CU) and at least two distributed units (DUs). Protocol stacks of a packet data convergence protocol (PDCP) layer, a radio link control (RLC) protocol layer and a media access control (MAC) layer are arranged in the central unit, physical (PHY) layer protocol stacks are arranged in the distributed units, and the examples of the disclosure do not limit a specific implementation of the base station 12.

A wireless connection may be established between the base station 12 and the terminal 11 through a wireless radio. In different implementations, the wireless radio is a wireless radio based on a fourth-generation mobile communication network technology (4G) standard; or the wireless radio is a wireless radio based on a fifth-generation mobile communication network technology (5G) standard, for example, the wireless radio is a new radio; or the wireless radio may also be a wireless radio based on a next generation mobile communication network technology standard of 5G.

In some examples, an end to end (E2E) connection may also be established between the terminals 11. For example, there are scenarios of vehicle to vehicle (V2V) communication, vehicle to infrastructure (V2I) communication, vehicle to pedestrian (V2P) communication and the like in vehicle to everything (V2X) communication.

In some examples, the above wireless communication system may also contain a network management device 13.

The plurality of base stations 12 are connected with the network management device 13 respectively. The network management device 13 may be a core network device in the wireless communication system, for example, the network management device 13 may be a mobility management entity (MME) in an evolved packet core (EPC). Or the network management device may also be other core network devices, for example, a serving gateway (SGW), a public data network gateway (PGW), a policy and charging rules function (PCRF) unit or a home subscriber server (HSS). The examples of the disclosure do not limit an implementation form of the network management device 13.

Figure 2:
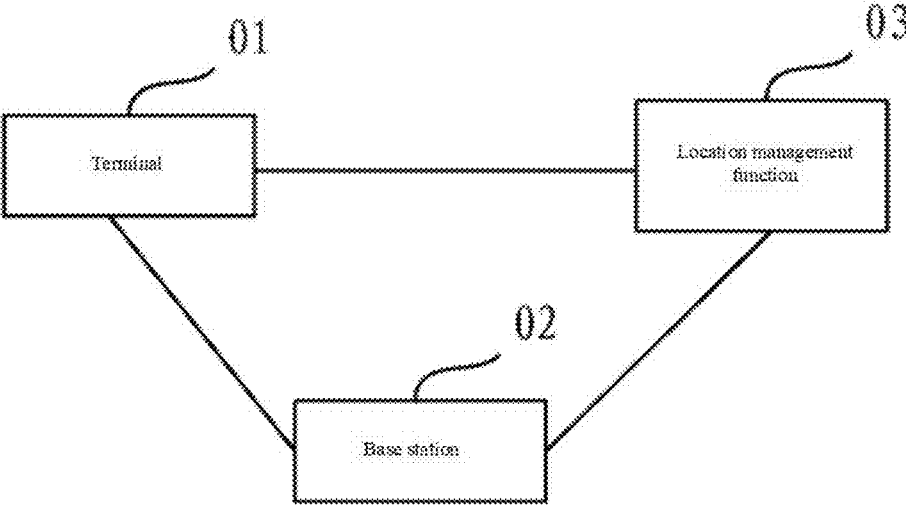
FIG. 2 is a schematic diagram of a scenario of positioning a terminal provided by an example of the disclosure.

In order to better understand the technical solution described by any example of the disclosure, first, a scenario of positioning a terminal is described through an example. Please refer to FIG. 2, a wireless network communication system includes a terminal 01, a base station 02 and a location management function (LMF) 03. As for a downlink positioning technology, when a network needs to perform positioning on the terminal, the location management function (LMF) will send auxiliary positioning information and location request information to the terminal respectively through a long-term evolution (LTE) positioning protocol (LPP). The terminal will obtain a measurement gap from the base station in a request manner. The terminal completes positioning measurement of the terminal by using information such as the auxiliary positioning information, the location request information and the measurement gap information, a positioning result of the positioning measurement and/or location calculation is obtained, and the positioning result is fed back to the location management function (LMF).

In an example, taking time difference of arrival (TDOA) in the downlink positioning technology as an example, a method for positioning a terminal is described. Please refer to FIG. 3, the method for positioning the terminal includes:

step a, the location management function (LMF) sends auxiliary positioning information to the terminal through a long-term evolution (LTE) positioning protocol (LPP) message. In an example, the long-term evolution (LTE) positioning protocol (LPP) message may be transparently transmitted to the terminal through the base station, that is, transmitted to the terminal through transparent transmission. Here, specifically, please refer to FIG. 4.

Figure 5:
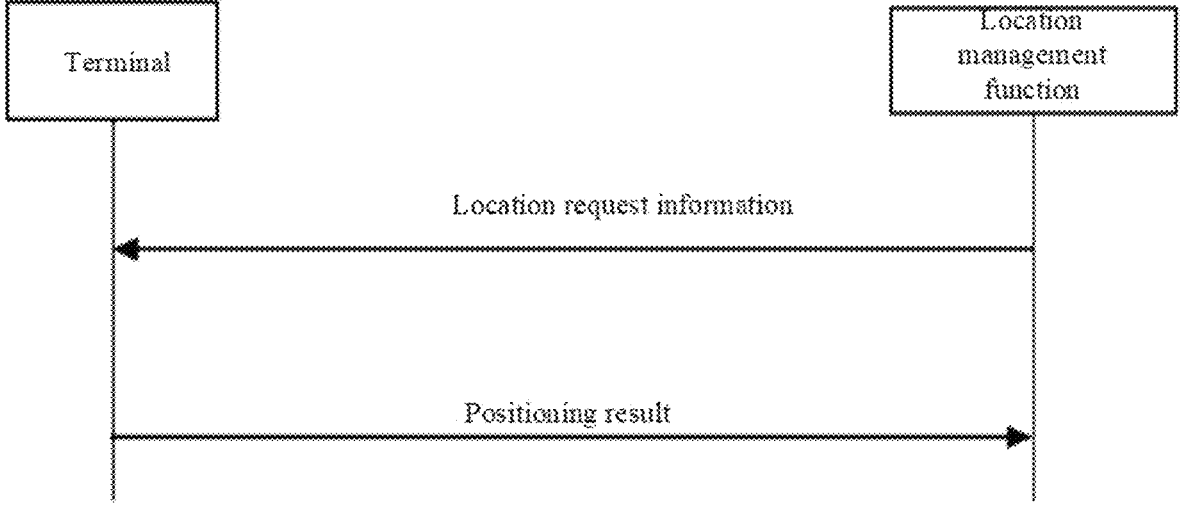
FIG. 5 is a schematic diagram of a method for positioning a terminal provided by an example of the disclosure.

Step b, the location management function (LMF) sends location request information to the terminal through the long-term evolution (LTE) positioning protocol (LPP) message. Here, specifically, please refer to FIG. 5.

Figure 6:
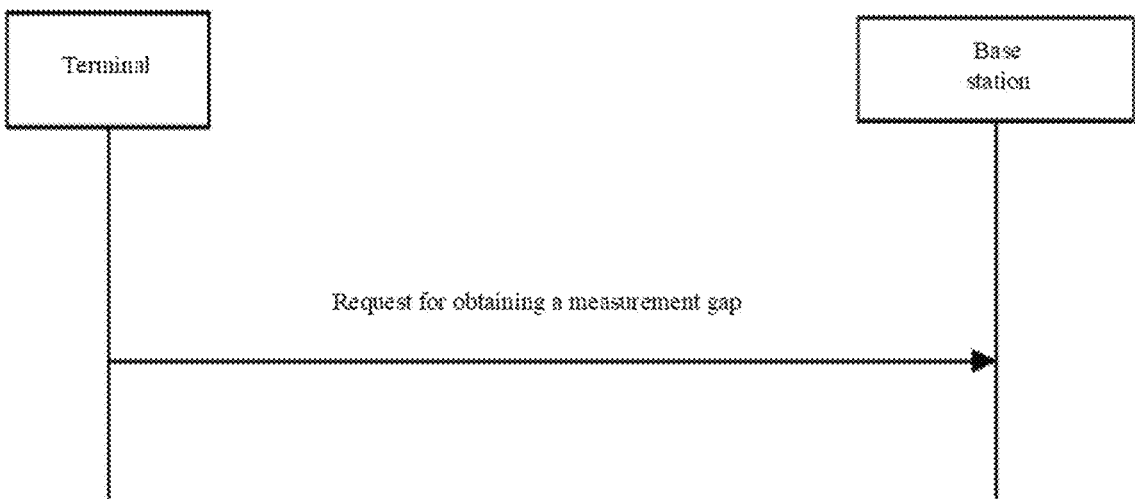
FIG. 6 is a schematic diagram of a method for positioning a terminal provided by an example of the disclosure.

Step c, the terminal requests a measurement gap from the base station. Here, specifically, please refer to FIG. 6.

Step d, the base station configures the measurement gap for the terminal and sends the measurement gap to the terminal.

Step e, the terminal measures a positioning reference signal (PRS) by using information such as the auxiliary positioning information, the location request information and the measurement gap to obtain a positioning result of positioning measurement. Here, specifically, please refer to FIG. 5.

Step f, the terminal sends the positioning result to the location management function (LMF) through the long-term evolution (LTE) positioning protocol (LPP) message. Here, specifically, please refer to FIG. 5.

As shown in FIG. 7, an example of the disclosure provides a method for positioning a terminal, performed by a core network element and including:

step 71, a first message to be used by the terminal to perform positioning is sent.

The first message includes auxiliary positioning information and location request information. The auxiliary positioning information is used by the terminal to perform positioning measurement, and the location request information is used to request obtaining of a positioning result of the positioning measurement.

In the examples of the disclosure, the first message to be used by the terminal to perform positioning is sent, and the first message includes the auxiliary positioning information and the location request information. Here, as the first message for positioning of the terminal sent by the core network element includes the auxiliary positioning information and the location request information at the same time, the core network element may send the auxiliary positioning information and the location request information to the terminal or the base station by sending the first message, the positioning measurement of the terminal is implemented, and the positioning result is obtained. Compared with a manner that the core network element needs to use a plurality of different positioning messages to respectively send the auxiliary positioning information and the location request information, the number of times of sending the positioning messages is reduced, and thus an end-to-end delay of positioning of the terminal is shortened.

Here, the core network element may be a location management function (LMF) in a core network. It needs to be noted that the core network element may also be other functional entities in the core network.

Here, the terminal may be a device with a wireless transceiving function. The terminal may be but is not limited to a mobile phone, a tablet computer, a wearable device, a vehicle-mounted terminal, a road side unit (RSU), a smart home terminal, an industrial sensing device and/or a medical device and the like. The terminal may be deployed on the land, may also be deployed in the sea (for example, on a steamship on a sea surface), and may also be deployed in the air (for example, on an airplane, a balloon and a satellite).

In an example, the positioning measurement may be that the terminal measures positioning reference signals (PRSs) sent by different base stations, time of arrival (TOA) or time difference of arrival (TDOA) of the positioning reference signals (PRSs) sent by the different base stations is obtained, and a coordinate location of the terminal is obtained through calculation in combination with location coordinates of each base station.

In an example, please refer to FIG. 8, a relative difference of a transmission delay of the positioning reference signal between each base station and the terminal is calculated according to time of receiving, by the terminal, the positioning reference signals sent by three or more base stations (for example, three base stations, respectively, the base station 1, the base station 2 and the base station 3) and a difference of time of receiving, by the terminal, the positioning reference signals sent by the base stations. Then, a location of the terminal is calculated according to the relative difference of the transmission delay and the location coordinates of the base stations. Here, the positioning reference signal sent by each base station to the terminal may be a downlink positioning reference signal (PRS).

Here, the base station is an interface device through which the terminal accesses a network. The base station may be various types of base stations, for example, a third-generation mobile communication (3G) network base station, a fourth-generation mobile communication (4G) network base station, a fifth-generation mobile communication (5G) network base station or other evolution base stations.

In an example, the auxiliary positioning information may be configuration information which configures for the terminal to perform the positioning measurement. Here, the auxiliary positioning information may be the auxiliary positioning information in step a.

In an example, the auxiliary positioning information may indicate precision information of the positioning reference signal (PRS) sent by the base station, height information of a launching point of sending the positioning reference signal (PRS) by the base station and coordinate information of a location where the base station is located. The terminal may more accurately determine a signal intensity and/or receiving time information of the received positioning reference signal in combination with the auxiliary positioning information, so that a more accurate positioning result is obtained.

In an example, the auxiliary positioning information may also indicate configuration information of various positioning manners in which the terminal performs the positioning measurement. The terminal, after receiving the auxiliary positioning information, selects one positioning manner from the various positioning manners, and performs positioning according to configuration information corresponding to the selected positioning manner and indicated by the auxiliary positioning information.

In an example, the auxiliary positioning information may also indicate a time-frequency domain location where the base station sends the positioning reference signal. In this way, the terminal may receive the positioning reference signal in the corresponding time-frequency domain location according to indication of the auxiliary positioning information.

In an example, the location request information may be information which requests the terminal to perform the positioning measurement and requests to feed back the positioning result. Here, the location request information may include information of a positioning manner for positioning the terminal required to be used by the terminal and a quality of service (Qos) grade. The terminal, after receiving the location request information, starts to perform the positioning measurement by using the positioning manner and the quality of service (Qos) grade indicated by the location request information, and feeds back the positioning result of the positioning measurement to the core network element. Here, the location request information may be the location request information in step b.

In an example, it may be that the core network element, when receiving a request for performing the positioning measurement of the terminal, sends the first message used to perform positioning on the terminal. For example, the core network element, when receiving a request for performing positioning tracking on the terminal, sends the first message to be used by the terminal to perform positioning specific to the request of the positioning tracking.

In an example, it may be that the core network element, when receiving the request for performing the positioning measurement of the terminal through an access network, sends the first message to be used by the terminal to perform positioning. For example, the terminal needs to know coordinate information of a location where the terminal is located, the request of the positioning measurement is sent to the core network element through the access network, and the core network element, after receiving the request of the positioning measurement, sends the first message to be used by the terminal to perform positioning.

In an example, the first message is a new radio positioning protocol a (NRPPa) message. The new radio positioning protocol a (NRPPa) message is a message for wireless communication based on a new radio positioning protocol a (NRPPa), that is, the first message is packaged and sent based on the new radio positioning protocol a (NRPPa).

In an example, it may be that the core network element sends, to the base station, the new radio positioning protocol a (NRPPa) message to be used by the terminal to perform positioning. Here, the new radio positioning protocol a (NRPPa) message includes the auxiliary positioning information and the location request information. The base station, after receiving the new radio positioning protocol a (NRPPa) message, will determine a radio resource control (RRC) message according to the new radio positioning protocol a (NRPPa) message and send the radio resource control (RRC) message to the terminal. Here, the radio resource control (RRC) message includes the auxiliary positioning information and the location request information. Here, the auxiliary positioning information in the radio resource control (RRC) message is determined according to the auxiliary positioning information in the new radio positioning protocol a (NRPPa) message, and the location request information in the radio resource control (RRC) message is determined according to the location request information in the new radio positioning protocol a (NRPPa) message.

In an example, the new radio positioning protocol a (NRPPa) message includes the auxiliary positioning information, the location request information and measurement gap information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and a measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the measurement gap information in the new radio positioning protocol a (NRPPa) message.

In an example, the new radio positioning protocol a (NRPPa) message includes the auxiliary positioning information and the location request information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and the measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the location request information in the new radio positioning protocol a (NRPPa) message.

In an example, the terminal, after receiving the measurement gap, performs the positioning measurement within a time length indicated by the measurement gap. For example, the time length may be 5 ms, 5.5 ms, 6 ms, 6.5 ms, 7 ms and the like.

In an example, the new radio positioning protocol a (NRPPa) message carrying the auxiliary positioning information and the location request information does not carry the measurement gap information, the core network element may also send the measurement gap information to the base station independently through the new radio positioning protocol a (NRPPa) message, and the base station, after receiving the measurement gap information, determines the measurement gap based on the measurement gap information and sends the measurement gap to the terminal through the radio resource control (RRC) message. It needs to be noted that the radio resource control (RRC) message may be a radio resource control (RRC) message sent by the base station to the terminal and carrying the auxiliary positioning information and the location request information. In this way, the terminal, after receiving the radio resource control (RRC) message, may perform the positioning measurement based on the auxiliary positioning information, the location request information and the measurement gap to obtain the positioning result of the positioning measurement.

In an example, the first message is a long-term evolution positioning protocol (LPP) message. The long-term evolution positioning protocol (LPP) message is a message for wireless communication based on the long-term evolution positioning protocol (LPP), that is, the first message is packaged and sent based on the long-term evolution positioning protocol (LPP) message.

In an example, it may be that the long-term evolution positioning protocol (LPP) message to be used by the terminal to perform positioning is sent to the terminal. Here, the long-term evolution positioning protocol (LPP) message includes the auxiliary positioning information and the location request information. Here, the core network element may also send the new radio positioning protocol a (NRPPa) message to the base station. The new radio positioning protocol a (NRPPa) message carries the measurement gap information, and the measurement gap information is used by the base station to determine the measurement gap of the positioning measurement of the terminal. The base station, after receiving the measurement gap information, determines the measurement gap based on the measurement gap information and sends the measurement gap to the terminal through the radio resource control (RRC) message. In this way, the terminal may perform the positioning measurement based on the received auxiliary positioning information, location request information and measurement gap to obtain the positioning result of the positioning measurement.

In an example, it may be that a long-term evolution positioning protocol (LPP) message to be used by the terminal to perform positioning is sent to the terminal. Here, the long-term evolution positioning protocol (LPP) message includes the auxiliary positioning information and the location request information. Here, when the terminal does not receive a measurement gap, the terminal will also send a request message for obtaining the measurement gap to the base station so as to obtain the measurement gap from the base station. In this way, the terminal may perform the positioning measurement based on the received auxiliary positioning information, location request information and measurement gap to obtain the positioning result of the positioning measurement.

In the example of the disclosure, the first message sent by the core network element and to be used by the terminal to perform positioning includes the auxiliary positioning information and the location request information at the same time, the core network element can send the auxiliary positioning information and the location request information to the terminal by sending a first message, the positioning measurement of the terminal is implemented, and the positioning result is obtained. Compared with a manner that the core network element needs to use a plurality of different positioning messages to send the auxiliary positioning information and the location request information respectively, the number of times of sending the positioning messages is reduced, and thus an end-to-end delay of positioning the terminal is shortened.

In the example of the disclosure, the first message received by the base station and used for positioning the terminal includes the auxiliary positioning information and the location request information at the same time, the core network element can send the auxiliary positioning information and the location request information to the base station by sending a first message, then the base station determines the measurement gap and sends the auxiliary positioning information, the location request information and the measurement gap to the terminal through a message, the positioning measurement of the terminal is implemented, and the positioning result is obtained. Compared with a manner that the core network element needs to use a plurality of different positioning messages to send the auxiliary positioning information and the location request information respectively, the number of times of sending the positioning messages is reduced, and thus the end-to-end delay of positioning the terminal is shortened.

Figure 9:
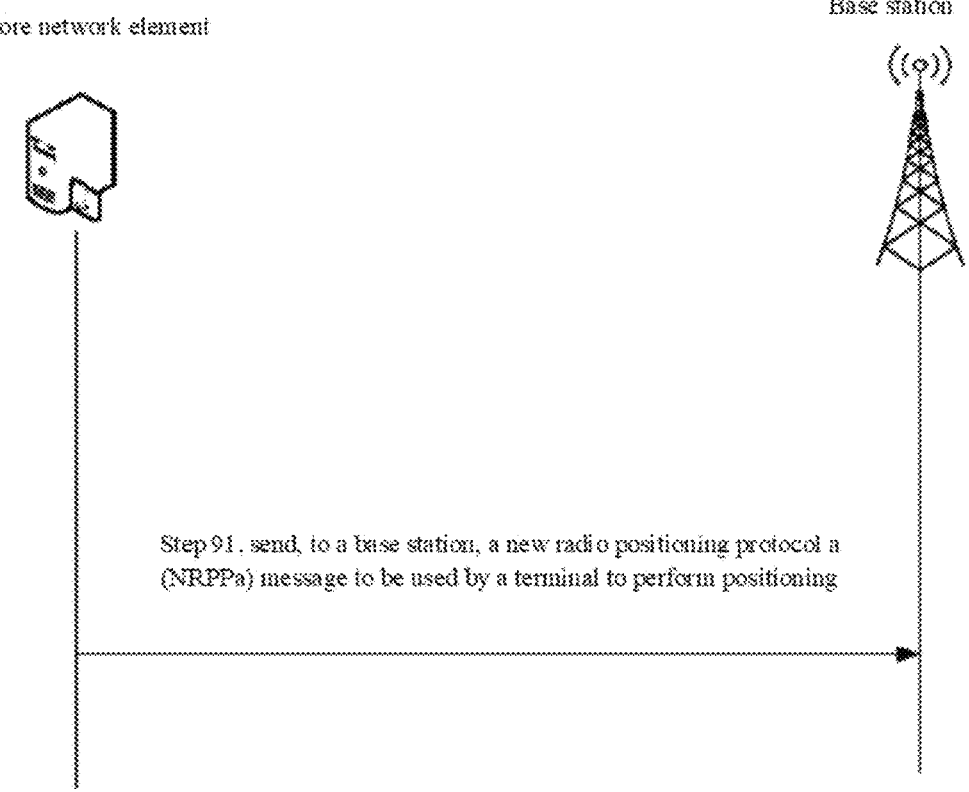
FIG. 9 is a schematic diagram of a method for positioning a terminal provided by an example of the disclosure.

As shown in FIG. 9, an example of the disclosure provides a method for positioning a terminal. A first message is a new radio positioning protocol a (NRPPa) message. Step 71 includes:

Step 91, the new radio positioning protocol a (NRPPa) message to be used by the terminal to perform positioning is sent to the base station.

Here, the new radio positioning protocol a (NRPPa) message may be a message sent based on a new radio positioning protocol a (NRPPa).

In an example, the core network element is a location management function (LMF). The new radio positioning protocol a (NRPPa) is communication message type between the base station and the location management function (LMF).

In an example, it may be that the core network element, when receiving a request for performing positioning measurement of the terminal, sends, to the base station, the new radio positioning protocol a (NRPPa) message to be used by the terminal to perform positioning. For example, the core network element, when receiving a request for performing positioning tracking on the terminal, sends, to the base station, the new radio positioning protocol a (NRPPa) message to be used by the terminal to perform positioning specific to the request of the positioning tracking.

In an example, the base station, after receiving the new radio positioning protocol a (NRPPa) message, will determine a radio resource control (RRC) message according to the new radio positioning protocol a (NRPPa) message and send the radio resource control (RRC) message to the terminal. Here, the radio resource control (RRC) message includes auxiliary positioning information, location request information and a measurement gap. Here, the auxiliary positioning information in the radio resource control (RRC) message is determined according to auxiliary positioning information in the new radio positioning protocol a (NRPPa) message, the location request information in the radio resource control (RRC) message is determined according to location request information in the new radio positioning protocol a (NRPPa) message, and the measurement gap in the radio resource control (RRC) message is determined according to location request information in the new radio positioning protocol a (NRPPa) message. The terminal performs the positioning measurement according to the auxiliary positioning information, the location request information and the measurement gap to obtain a positioning result of the positioning measurement and sends the positioning result to the base station. The base station may send the positioning result to the core network element through the new radio positioning protocol a (NRPPa) message.

Figure 10:
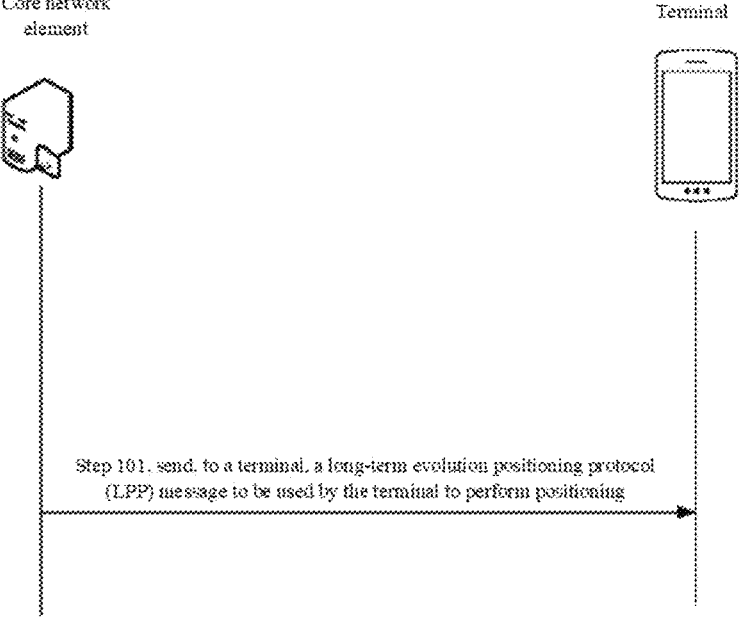
FIG. 10 is a schematic diagram of a method of positioning a terminal provided by an example of the disclosure.

As shown in FIG. 10, an example of the disclosure provides a method for positioning a terminal. The first message is a long-term evolution positioning protocol (LPP) message. Step 71 includes:

Step 101, the long-term evolution positioning protocol (LPP) message to be used by the terminal to perform positioning is sent to the terminal.

Here, the long-term evolution positioning protocol (LPP) message may be a message sent based on a long-term evolution positioning protocol (LPP). In an example, it may be that the long-term evolution positioning protocol (LPP) message to be used by the terminal to perform positioning may be sent to the terminal in a transparent transmission manner by a base station.

In an example, it may be that the core network element, when receiving a request of performing positioning measurement of the terminal, sends, to the base station, the long-term evolution positioning protocol (LPP) message to be used by the terminal to perform positioning. For example, the core network element, when receiving the request for performing positioning tracking on the terminal, sends, to the base station, the long-term evolution positioning protocol (LPP) message to be used by the terminal to perform positioning specific to the request of positioning tracking. Here, the long-term evolution positioning protocol (LPP) message includes auxiliary positioning information and location request information.

In an example, the core network element will also send the new radio positioning protocol a (NRPPa) message to the base station. The new radio positioning protocol a (NRPPa) message includes measurement gap information. The measurement gap information is used by the base station to determine a measurement gap of the positioning measurement of the terminal. The base station, after receiving the measurement gap information, determines the measurement gap based on the measurement gap information and sends the measurement gap to the terminal through a radio resource control (RRC) message. In this way, the terminal may perform the positioning measurement based on the received auxiliary positioning information, location request information and measurement gap to obtain a positioning result of the positioning measurement.

Figure 11:
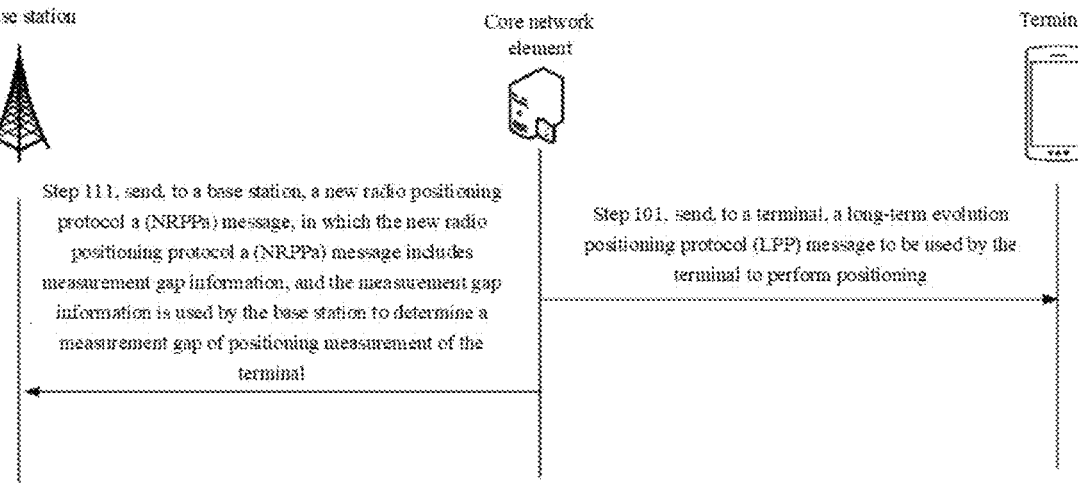
FIG. 11 is a schematic diagram of a method for positioning a terminal provided by an example of the disclosure.

As shown in FIG. 11, an example of the disclosure provides a method for positioning a terminal, further including:

step 111, a new radio positioning protocol a (NRPPa) message is sent to a base station. The new radio positioning protocol a (NRPPa) message includes measurement gap information. The measurement gap information is used by the base station to determine a measurement gap of positioning measurement of the terminal.

In an example, the core network element sends the measurement gap information to the base station independently through the new radio positioning protocol a (NRPPa) message, and the base station, after receiving the measurement gap information, determines the measurement gap based on the measurement gap information and actively sends the measurement gap to the terminal through a radio resource control (RRC) message. In this way, the terminal may perform the positioning measurement based on the auxiliary positioning information, the location request information and the measurement gap to obtain a positioning result of the positioning measurement.

In an example, the measurement gap may include a time start point and a time end point. For example, the time start point is Pt ms, and the time end point is $3^{rd}$ ms. In another example, the measurement gap may include the time start point and a duration. For example, the time start point is Pt ms, and the time duration may be 5 ms, 5.5 ms, 6 ms, 6.5 ms, 7 ms, and the like. In an example, the terminal, after receiving the measurement gap, performs the positioning measurement within the measurement gap.

Figure 12:
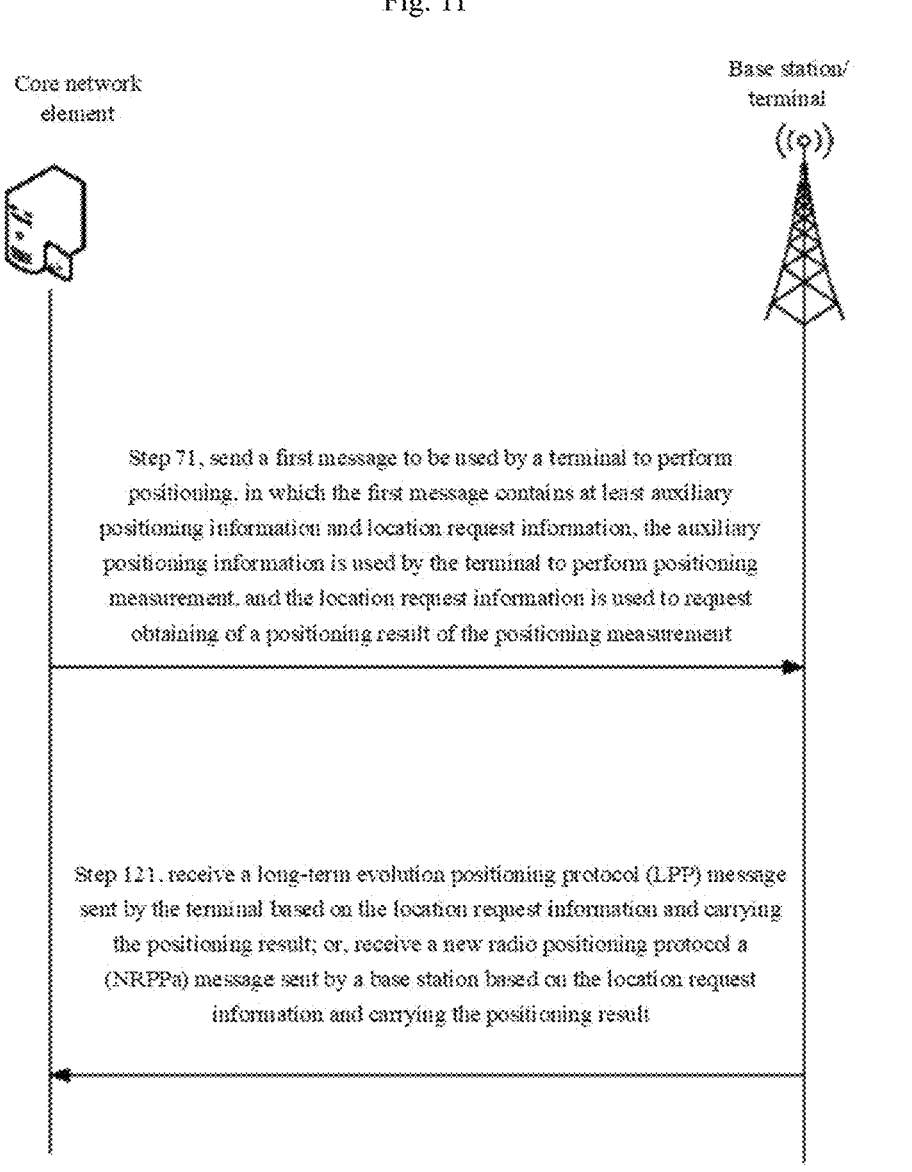
FIG. 12 is a schematic diagram of a method for positioning a terminal provided by an example of the disclosure.

As shown in FIG. 12, an example of the disclosure provides a method for positioning a terminal, further including:

step 121, a long-term evolution positioning protocol (LPP) message sent by the terminal based on location request information and carrying a positioning result is received;

or, a new radio positioning protocol a (NRPPa) message sent by a base station based on location request information and carrying the positioning result is received.

In an example, the long-term evolution positioning protocol (LPP) message carrying a positioning result of a predetermined format is received. Or, the new radio positioning protocol a (NRPPa) message carrying the positioning result of the predetermined format is received. Here, the predetermined format may include data precision, whether a mean value is fed back, a data length and the like in the positioning result.

In an example, the terminal sends the positioning result to the base station through a radio resource control (RRC) message, and the base station determines the new radio positioning protocol a (NRPPa) message based on the radio resource control (RRC) message and sends the new radio positioning protocol a (NRPPa) message to the core network element. A positioning result determined based on the positioning result in the radio resource control (RRC) message is carried in the new radio positioning protocol a (NRPPa) message.

As shown in FIG. 13, an example of the disclosure provides a method for positioning a terminal, performed by the base station and including:

step 131, a first message sent by a core network element and to be used by the terminal to perform positioning is received.

The first message includes auxiliary positioning information and location request information. The auxiliary positioning information is used by the terminal to perform positioning measurement. The location request information is used to request obtaining of a positioning result of the positioning measurement.

Here, the core network element may be a location management function (LMF) in a core network. It needs to be noted that the core network element may also be other functional entities in the core network.

Here, the terminal may be a device with a wireless transceiving function. The terminal may be but is not limited to a mobile phone, a tablet computer, a wearable device, a vehicle-mounted terminal, a road side unit (RSU), a smart home terminal, an industrial sensing device and/or a medical device and the like. The terminal may be deployed on the land, may also be deployed in the sea (for example, on a steamship on a sea surface), and may also be deployed in the air (for example, on an airplane, a balloon and a satellite).

In an example, the positioning measurement may be that the terminal measures positioning reference signals (PRSs) sent by different base stations, time of arrival (TOA) or time difference of arrival (TDOA) of the positioning reference signals sent by the different base stations is obtained, and a coordinate location of the terminal is obtained through calculation in combination with location coordinates of each base station.

In an example, please refer to FIG. 8 again, a relative difference of a transmission delay of the positioning reference signal between each base station and the terminal is calculated according to time of receiving, by the terminal, the positioning reference signals sent by three or more base stations (for example, three base stations, respectively, the base station 1, the base station 2 and the base station 3) and a difference of time of receiving, by the terminal, the positioning reference signals sent by the base stations. Then, a location of the terminal is calculated according to the relative difference of the transmission delay and the location coordinates of the base stations. Here, the positioning reference signal sent by each base station to the terminal may be a downlink positioning reference signal (PRS).

Here, the base station is an interface device through which the terminal accesses a network. The base station may be various types of base stations, for example, a third-generation mobile communication (3G) network base station, a fourth-generation mobile communication (4G) network base station, a fifth-generation mobile communication (5G) network base station or other evolution base stations.

In an example, the auxiliary positioning information may be configuration information which configures for the terminal to perform the positioning measurement. Here, the auxiliary positioning information may be the auxiliary positioning information in step a.

In an example, the auxiliary positioning information may indicate precision information of the positioning reference signal (PRS) sent by the base station, height information of a launching point of sending the positioning reference signal (PRS) by the base station and coordinate information of a location where the base station is located. The terminal may more accurately determine a signal intensity and/or receiving time information of the received positioning reference signal in combination with the auxiliary positioning information, so that a more accurate positioning result is obtained.

In an example, the auxiliary positioning information may also indicate configuration information of various positioning manners in which the terminal performs the positioning measurement. The terminal, after receiving the auxiliary positioning information, selects one positioning manner from the various positioning manners, and performs positioning according to configuration information corresponding to the selected positioning manner and indicated by the auxiliary positioning information.

In an example, the auxiliary positioning information may also indicate a time-frequency domain location where the base station sends the positioning reference signal. In this way, the terminal may receive the positioning reference signal in the corresponding time-frequency domain location according to indication of the auxiliary positioning information.

In an example, the location request information may be information which requests the terminal to perform the positioning measurement and requests to feed back the positioning result. Here, the location request information may include information of a positioning manner for positioning the terminal required to be used by the terminal and a quality of service (Qos) grade. The terminal, after receiving the location request information, starts to perform the positioning measurement by using the positioning manner and the quality of service (Qos) grade indicated by the location request information, and feeds back the positioning result of the positioning measurement to the core network element. Here, the location request information may be the location request information in step b.

In an example, it may be that the core network element, when receiving a request for performing the positioning measurement of the terminal, sends the first message used to perform positioning on the terminal, and the base station receives the first message. For example, the core network element, when receiving a request for performing positioning tracking on the terminal, sends the first message to be used by the terminal to perform positioning specific to the request of the positioning tracking, and the base station receives the first message.

In an example, it may be that the core network element, when receiving the request for performing the positioning measurement of the terminal through an access network, sends the first message to be used by the terminal to perform positioning, and the base station receives the first message. For example, the terminal needs to know coordinate information of a location where the terminal is located, the request of the positioning measurement is sent to the core network element through the access network, and the core network element, after receiving the request of the positioning measurement, sends the first message to be used by the terminal to perform positioning, and the base station receives the first message.

In an example, the first message is a new radio positioning protocol a (NRPPa) message. The new radio positioning protocol a (NRPPa) message is a message for wireless communication based on a new radio positioning protocol a (NRPPa), that is, the first message is packaged and sent based on the new radio positioning protocol a (NRPPa).

In an example, it may be that the core network element sends, to the base station, the new radio positioning protocol a (NRPPa) message to be used by the terminal to perform positioning. Here, the new radio positioning protocol a (NRPPa) message includes the auxiliary positioning information and the location request information. The base station, after receiving the new radio positioning protocol a (NRPPa) message, will determine a radio resource control (RRC) message according to the new radio positioning protocol a (NRPPa) message and send the radio resource control (RRC) message to the terminal. Here, the radio resource control (RRC) message includes the auxiliary positioning information and the location request information. Here, the auxiliary positioning information in the radio resource control (RRC) message is determined according to the auxiliary positioning information in the new radio positioning protocol a (NRPPa) message, and the location request information in the radio resource control (RRC) message is determined according to the location request information in the new radio positioning protocol a (NRPPa) message.

In an example, the new radio positioning protocol a (NRPPa) message includes the auxiliary positioning information, the location request information and measurement gap information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and a measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the measurement gap information in the new radio positioning protocol a (NRPPa) message.

In an example, the new radio positioning protocol a (NRPPa) message includes the auxiliary positioning information and the location request information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and the measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the location request information in the new radio positioning protocol a (NRPPa) message.

In an example, the terminal, after receiving the measurement gap, performs the positioning measurement within a time length indicated by the measurement gap. For example, the time length may be 5 ms, 5.5 ms, 6 ms, 6.5 ms, 7 ms and the like.

In an example, the new radio positioning protocol a (NRPPa) message carrying the auxiliary positioning information and the location request information does not carry the measurement gap information, the core network element may also send the measurement gap information to the base station independently through the new radio positioning protocol a (NRPPa) message, and the base station, after receiving the measurement gap information, determines the measurement gap based on the measurement gap information and sends the measurement gap to the terminal through the radio resource control (RRC) message. It needs to be noted that the radio resource control (RRC) message may be a radio resource control (RRC) message sent by the base station to the terminal and carrying the auxiliary positioning information and the location request information. In this way, the terminal, after receiving the radio resource control (RRC) message, may perform the positioning measurement based on the auxiliary positioning information, the location request information and the measurement gap to obtain a positioning result of the positioning measurement.

In the example of the disclosure, the first message received by the base station and to be used for positioning the terminal includes the auxiliary positioning information and the location request information at the same time, the core network element can send the auxiliary positioning information and the location request information to the base station by sending a first message, then the base station determines the measurement gap and sends the auxiliary positioning information, the location request information and the measurement gap to the terminal through a message, the positioning measurement of the terminal is implemented, and the positioning result is obtained. Compared with a manner that the core network element needs to use a plurality of different positioning messages to send the auxiliary positioning information and the location request information respectively, the number of times of sending the positioning messages is reduced, and thus an end-to-end delay of positioning the terminal is shortened.

As shown in FIG. 14, an example of the disclosure provides a method for positioning a terminal, further including:

step 141, a radio resource control (RRC) determined based on a new radio positioning protocol a (NRPPa) message is sent to the terminal. The radio resource control (RRC) includes auxiliary positioning information and location request information.

Here, the new radio positioning protocol a (NRPPa) message may be a message sent based on a new radio positioning protocol a (NRPPa).

In an example, the new radio positioning protocol a (NRPPa) message received by the base station includes auxiliary positioning information and location request information. The base station, after receiving the new radio positioning protocol a (NRPPa) message, will determine a radio resource control (RRC) message according to the new radio positioning protocol a (NRPPa) message and send the radio resource control (RRC) message to the terminal. Here, the radio resource control (RRC) message includes auxiliary positioning information and location request information. Here, the auxiliary positioning information in the radio resource control (RRC) message is generated according to the auxiliary positioning information in the new radio positioning protocol a (NRPPa) message, and the location request information in the radio resource control (RRC) message is generated according to the location request information in the new radio positioning protocol a (NRPPa) message.

In an example, the new radio positioning protocol a (NRPPa) message includes the auxiliary positioning information, the location request information and the measurement gap information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and a measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the measurement gap information in the new radio positioning protocol a (NRPPa) message.

In an example, the new radio positioning protocol a (NRPPa) message includes the auxiliary positioning information and the location request information. The base station, after receiving the new radio positioning protocol a (NRPPa) message, will determine the radio resource control (RRC) message according to the new radio positioning protocol a (NRPPa) message and send the radio resource control (RRC) message to the terminal. Here, the radio resource control (RRC) message includes the auxiliary positioning information, the location request information and the measurement gap. Here, the auxiliary positioning information in the radio resource control (RRC) message is determined according to the auxiliary positioning information in the new radio positioning protocol a (NRPPa) message, the location request information in the radio resource control (RRC) message is determined according to the location request information in the new radio positioning protocol a (NRPPa) message, and the measurement gap in the radio resource control (RRC) message is determined according to the location request information in the new radio positioning protocol a (NRPPa) message.

In an example, the radio resource control (RRC) message further carries the measurement gap of the positioning measurement of the terminal, and the measurement gap is determined based on a positioning manner of the positioning measurement of the terminal indicated by the location request information or determined based on the measurement gap information.

In an example, when the positioning manner in which the terminal performs the positioning measurement is a first manner, the measurement gap is a first measurement gap, and when the positioning manner in which the terminal performs the positioning measurement is a second manner, the measurement gap is a second measurement gap. Here, the first manner may be a manner for measuring an angle of arrival (AOA) of a positioning reference signal, and the second manner may be a manner for measuring a time difference of arrival (TDOA) of the positioning reference signal.

As shown in FIG. 15, an example of the disclosure provides a method for positioning a terminal, further including:

step 151, a radio resource control (RRC) message sent by the terminal based on location request information and carrying a positioning result is received; and step 152, a new radio positioning protocol a (NRPPa) message carrying a positioning result is sent to a core network element. The new radio positioning protocol a (NRPPa) message is determined according to the radio resource control (RRC) message.

In an example, a new radio positioning protocol a (NRPPa) message carrying a positioning result of a predetermined format is received. Here, the predetermined format may include data precision, whether a mean value is fed back, a data length and the like in the positioning result.

In an example, the base station determines the new radio positioning protocol a (NRPPa) message based on the radio resource control (RRC) message. A positioning result determined based on the positioning result in the radio resource control (RRC) message is carried in the new radio positioning protocol a (NRPPa) message.

As shown in FIG. 16, an example of the disclosure provides a method for positioning a terminal, further including:

step 161, a new radio positioning protocol a (NRPPa) message sent by a core network element is received. The new radio positioning protocol a (NRPPa) message includes measurement gap information. The measurement gap information is used by a base station to determine a measurement gap of positioning measurement of the terminal.

In an example, the first message does not carry the measurement gap information. After the base station receives the first message, the core network element may send the measurement gap information to the base station independently through the new radio positioning protocol a (NRPPa) message. The base station, after receiving the measurement gap information, determines the measurement gap based on the measurement gap information and sends the measurement gap to the terminal through the radio resource control (RRC) message. In this way, the terminal may perform the positioning measurement based on auxiliary positioning information, location request information and the measurement gap to obtain a positioning result of the positioning measurement.

As shown in FIG. 17, an example of the disclosure provides a terminal positioning method, performed by a terminal and including:

step 171, a positioning message is received.

The positioning message includes auxiliary positioning information and location request information. The auxiliary positioning information is used by the terminal to perform positioning measurement. The location request information is used to request obtaining of a positioning result of the positioning measurement.

In an example, the positioning message sent by the core network element may be received. Here, the core network element may be a location management function (LMF) in a core network. It needs to be noted that the core network element may also be other functional entities in the core network.

Here, the terminal may be a device with a wireless transceiving function. The terminal may be but is not limited to a mobile phone, a tablet computer, a wearable device, a vehicle-mounted terminal, a road side unit (RSU), a smart home terminal, an industrial sensing device and/or a medical device and the like. The terminal may be deployed on the land, may also be deployed in the sea (for example, on a steamship on a sea surface), and may also be deployed in the air (for example, on an airplane, a balloon and a satellite).

In an example, the positioning measurement may be that the terminal measures positioning reference signals (PRSs) sent by different base stations, time of arrival (TOA) or time difference of arrival (TDOA) of the positioning reference signals (PRSs) sent by the different base stations is obtained, and a coordinate location of the terminal is obtained through calculation in combination with location coordinates of each base station.

In an example, please refer to FIG. 8 again, a relative difference of a transmission delay of the positioning reference signal between each base station and the terminal is calculated according to time of receiving, by the terminal, the positioning reference signals sent by three or more base stations (for example, three base stations, respectively, the base station 1, the base station 2 and the base station 3) and a difference of time of receiving, by the terminal, the positioning reference signals sent by the base stations. Then, a location of the terminal is calculated according to the relative difference of the transmission delay and the location coordinates of the base stations. Here, the positioning reference signal sent by each base station to the terminal may be a downlink positioning reference signal (PRS).

Here, the base station is an interface device through which the terminal accesses a network. The base station may be various types of base stations, for example, a third-generation mobile communication (3G) network base station, a fourth-generation mobile communication (4G) network base station, a fifth-generation mobile communication (5G) network base station or other evolution base stations.

In an example, the auxiliary positioning information may be configuration information which configures for the terminal to perform the positioning measurement. Here, the auxiliary positioning information may be the auxiliary positioning information in step a.

In an example, the auxiliary positioning information may indicate precision information of the positioning reference signal (PRS) sent by the base station, height information of a launching point of sending the positioning reference signal (PRS) by the base station and coordinate information of a location where the base station is located. The terminal may more accurately determine a signal intensity and/or receiving time information of the received positioning reference signal in combination with the auxiliary positioning information, so that a more accurate positioning result is obtained.

In an example, the auxiliary positioning information may also indicate configuration information of various positioning manners in which the terminal performs the positioning measurement. The terminal, after receiving the auxiliary positioning information, selects one positioning manner from the various positioning manners, and performs positioning according to configuration information corresponding to the selected positioning manner and indicated by the auxiliary positioning information.

In an example, the auxiliary positioning information may also indicate a time-frequency domain location where the base station sends the positioning reference signal. In this way, the terminal may receive the positioning reference signal in the corresponding time-frequency domain location according to indication of the auxiliary positioning information.

In an example, the location request information may be information which requests the terminal to perform the positioning measurement and requests to feed back the positioning result. Here, the location request information may include information of a positioning manner for positioning the terminal required to be used by the terminal and a quality of service (Qos) grade. The terminal, after receiving the location request information, starts to perform the positioning measurement by using the positioning manner and the quality of service (Qos) grade indicated by the location request information, and feeds back the positioning result of the positioning measurement to the core network element. Here, the location request information may be the location request information in step b.

In an example, it may be that the core network element, when receiving a request for performing the positioning measurement of the terminal, sends the first message used to perform positioning on the terminal. For example, the core network element, when receiving a request for performing positioning tracking on the terminal, sends the first message to be used by the terminal to perform positioning specific to the request of the positioning tracking.

In an example, it may be that the core network element, when receiving the request for performing the positioning measurement of the terminal through an access network, sends the first message to be used by the terminal to perform positioning. For example, the terminal needs to know coordinate information of a location where the terminal is located, the request of the positioning measurement is sent to the core network element through the access network, and the core network element, after receiving the request of the positioning measurement, sends the first message to be used by the terminal to perform positioning.

In an example, the terminal, after receiving the measurement gap, performs the positioning measurement within a time length indicated by the measurement gap. For example, the time length may be 5 ms, 5.5 ms, 6 ms, 6.5 ms, 7 ms and the like.

In an example, the first message is a long-term evolution positioning protocol (LPP) message. The long-term evolution positioning protocol (LPP) message is a message for wireless communication based on the long-term evolution positioning protocol (LPP). In other words, the first message is packaged and sent based on the long-term evolution positioning protocol (LPP) message.

In an example, it may be that the terminal receives the long-term evolution positioning protocol (LPP) message to be used by the terminal to perform positioning. Here, the long-term evolution positioning protocol (LPP) message includes auxiliary positioning information and location request information.

In an example, when the terminal does not receive the measurement gap, the terminal will also send a request message of obtaining a measurement gap to the base station and receive a measurement gap sent by the base station through the RRC specific to the request message. In this way, the terminal may perform the positioning measurement based on the received first message and measurement gap to obtain a positioning result of the positioning measurement. The measurement gap in the RRC message may be determined according to location request information in a new radio positioning protocol a (NRPPa) message sent by the core network element to the base station.

In the example of the disclosure, the first message sent by the core network element and to be used by the terminal to perform positioning includes auxiliary positioning information and location request information at the same time, the core network element can send the auxiliary positioning information and the location request information to the terminal by sending a first message, the positioning measurement of the terminal is implemented, and the positioning result is obtained. Compared with a manner that the core network element needs to use a plurality of different positioning messages to send the auxiliary positioning information and the location request information respectively, the number of times of sending the positioning messages is reduced, and thus an end-to-end delay of positioning the terminal is shortened.

Figure 18:
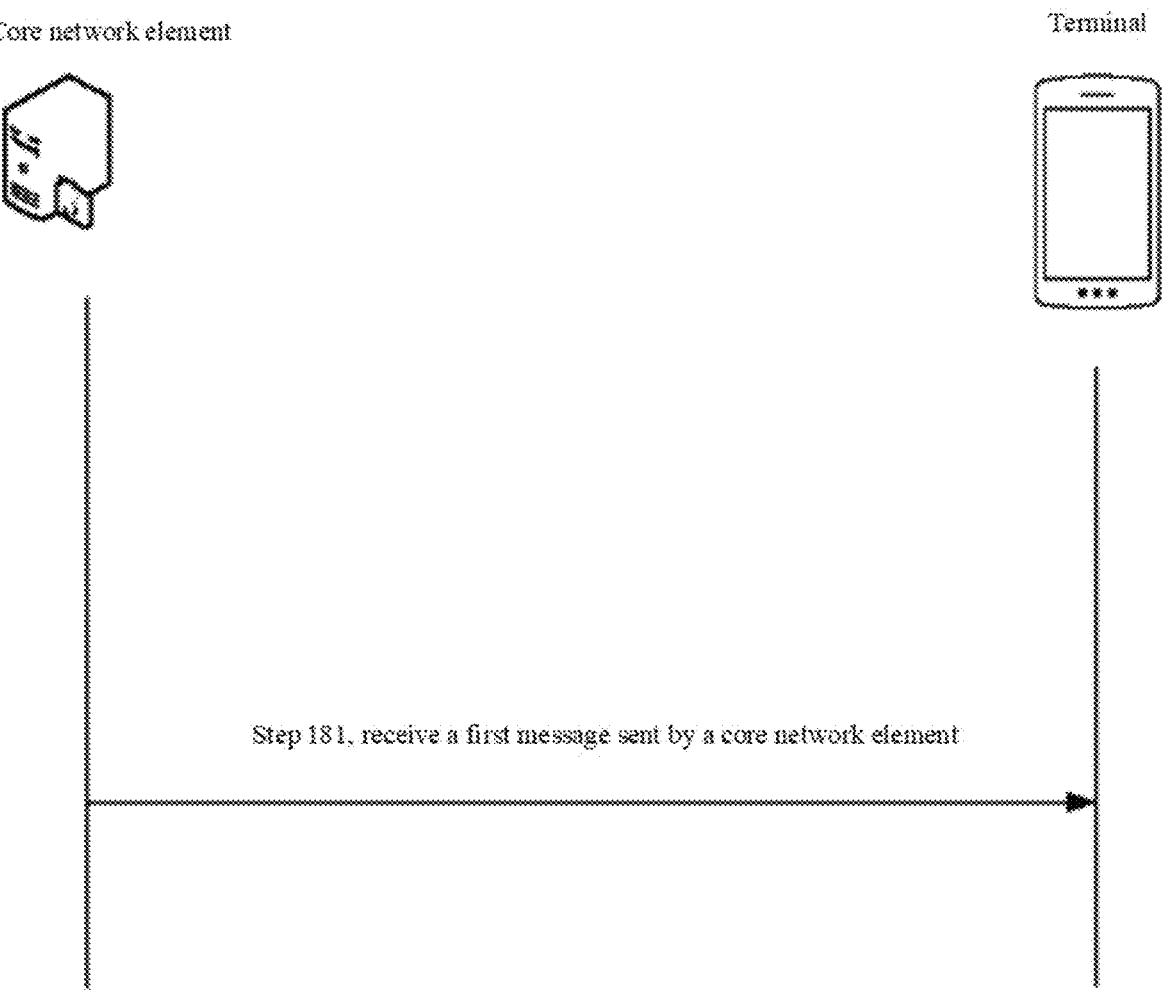
FIG. 18 is a schematic diagram of a method for positioning a terminal provided by an example of the disclosure.

As shown in FIG. 18, an example of the disclosure provides a method for positioning a terminal. In step 171, receiving the positioning message includes:

step 181, a first message sent by a core network element is received.

In an example, the first message is a long-term evolution positioning protocol (LPP) message. Here, the long-term evolution positioning protocol (LPP) message may be a message sent based on a long-term evolution positioning protocol (LPP). In other words, the first message is packaged and sent based on the long-term evolution positioning protocol (LPP) message.

In an example, it may be that the terminal receives the long-term evolution positioning protocol (LPP) message sent to the terminal by the base station in a transparent transmission manner and to be used by the terminal to perform positioning.

In an example, it may be that the core network element, when receiving a request of performing positioning measurement of the terminal, sends, to the base station, the long-term evolution positioning protocol (LPP) message to be used by the terminal to perform positioning. For example, the core network element, when receiving a request for performing positioning tracking on the terminal, sends, to the base station, the long-term evolution positioning protocol (LPP) message to be used by the terminal to perform positioning specific to the request of positioning tracking. Here, the long-term evolution positioning protocol (LPP) message includes auxiliary positioning information and location request information.

In an example, the terminal, after receiving the long-term evolution positioning protocol (LPP) message to be used by the terminal to perform positioning, will also send a request message for obtaining a measurement gap to the base station and receive the measurement gap sent by the base station through a radio resource control (RRC) message specific to the request message. In this way, the terminal may perform the positioning measurement based on the received long-term evolution positioning protocol (LPP) message and measurement gap to obtain the positioning result of the positioning measurement.

In an example, the terminal, after receiving the long-term evolution positioning protocol (LPP) message to be used by the terminal to perform positioning, will also receive the radio resource control (RRC) message sent actively by the base station and carrying the measurement gap. In this way, the terminal may perform the positioning measurement based on the received long-term evolution positioning protocol (LPP) message and measurement gap to obtain the positioning result of the positioning measurement.

Figure 19:
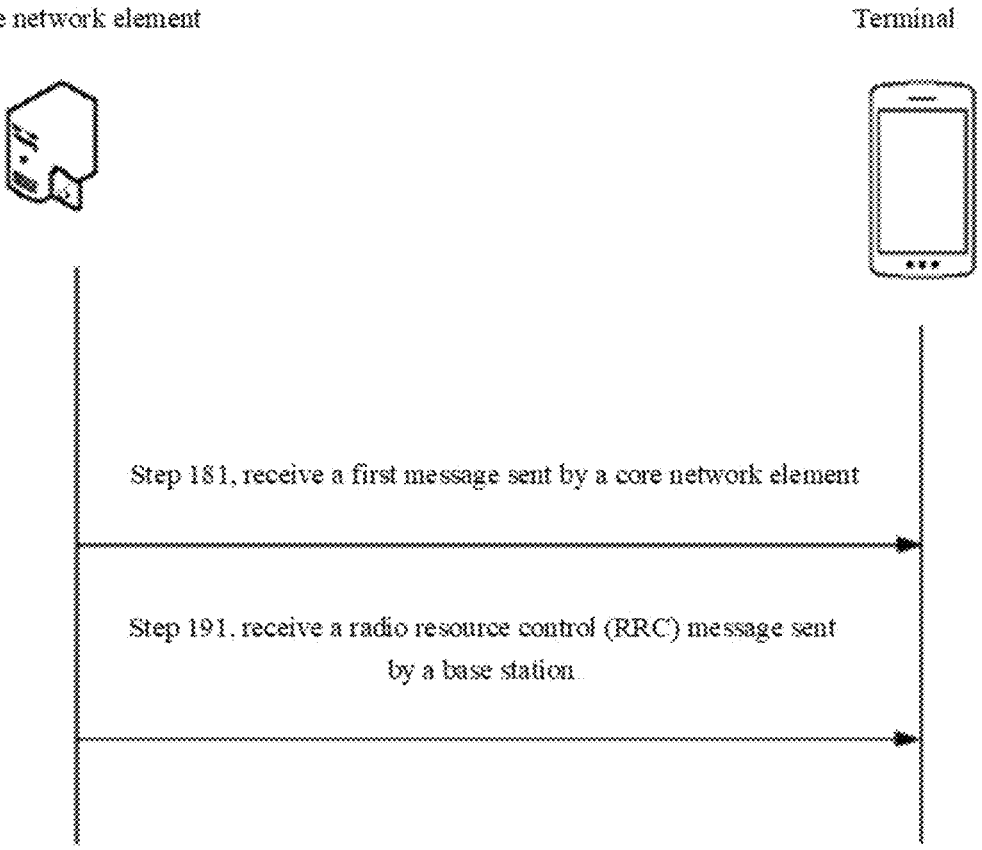
FIG. 19 is a schematic diagram of a method for positioning a terminal provided by an example of the disclosure.

It needs to be noted that receiving the long-term evolution positioning protocol (LPP) message and the radio resource control (RRC) message carrying the measurement gap may have no sequential order relationship. As shown in FIG. 19, an example of the disclosure provides a method for positioning a terminal, further including:

step 191, a radio resource control (RRC) message sent by a base station is received.

The radio resource control (RRC) message carries a measurement gap of positioning measurement of the terminal.

In an example, when the terminal does not receive the measurement gap, the terminal will also send a request message for obtaining the measurement gap to the base station and receive a radio resource control (RRC) message carrying the measurement gap sent by the base station specific to the request message. In this way, the terminal may perform the positioning measurement based on the received auxiliary positioning information, location request information and measurement gap to obtain the positioning result of the positioning measurement. As shown in FIG. 20, an example of the disclosure provides a terminal positioning method.

Receiving the positioning message includes:

step 201, a second message sent by a base station is received.

In an example, the second message is a radio resource control (RRC) message.

In an example, the radio resource control (RRC) message further carries a measurement gap of positioning measurement of a terminal. In this way, the terminal may receive auxiliary positioning information, location request information and the measurement gap in a radio resource control (RRC) message, so as to shorten a positioning delay.

Here, the base station sends the measurement gap to the terminal through the radio resource control (RRC) message. In this way, the terminal may perform the positioning measurement based on the received auxiliary positioning information, location request information and measurement gap to obtain a positioning result of the positioning measurement.

As shown in FIG. 21, an example of the disclosure provides a terminal positioning method, further including:

step 211, positioning measurement is performed on a positioning reference signal according to auxiliary positioning information, location request information and a measurement gap to obtain a positioning result.

In an example, the positioning measurement may be that a terminal measures positioning reference signals (PRSs) sent by different base stations according to the auxiliary positioning information, the location request information and the measurement gap, time of arrival (TOA) or time difference of arrival (TDOA) of the positioning reference signals sent by the different base stations is obtained, and a coordinate location of the terminal is obtained through calculation in combination with location coordinates of each the base station.

As shown in FIG. 22, an example of the disclosure provides a terminal positioning method, further including:

step 222, a radio resource control (RRC) message carrying a positioning result is sent to a base station based on location request information;

or, a long-term evolution positioning protocol (LPP) message carrying a positioning result is sent to a core network element based on location request information.

Here, the core network element may be a location management function (LMF).

In an example, a long-term evolution positioning protocol (LPP) message carrying a positioning result of a predetermined format is sent. Or, a radio resource control (RRC) message carrying a positioning result of a predetermined format is sent. Here, the predetermined format may include data precision, whether a mean value is fed back, a data length and the like in the positioning result.

In an example, the terminal sends the positioning result to the base station through a radio resource control (RRC) message, and the base station determines the new radio positioning protocol a (NRPPa) message based on the radio resource control (RRC) message, and sends the new radio positioning protocol a (NRPPa) message to the core network element. A positioning result determined based on the positioning result in the radio resource control (RRC) message is carried in the new radio positioning protocol a (NRPPa) message.

As shown in FIG. 23, an example of the disclosure provides a terminal positioning apparatus, performed by a core network element and including a first sending module 231.

The first sending module 231 is configured to send a first message to be used by a terminal to perform positioning.

The first message includes auxiliary positioning information and location request information, the auxiliary positioning information is used by the terminal to perform positioning measurement, and the location request information is used to request obtaining of a positioning result of the positioning measurement.

Figure 24:
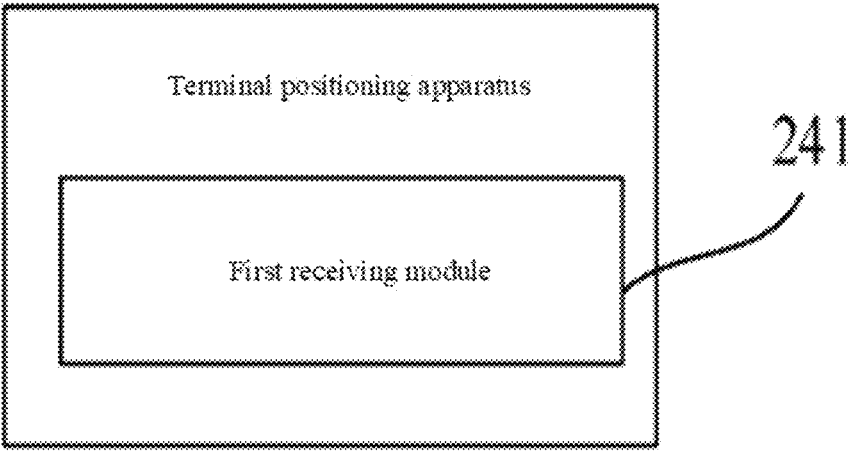
FIG. 24 is a schematic diagram of an apparatus for positioning a terminal provided by an example of the disclosure.

As shown in FIG. 24, an example of the disclosure provides a terminal positioning apparatus, performed by a base station and including a first receiving module 241.

The first receiving module 241 is configured to receive a first message sent by a core network element and to be used by a terminal to perform positioning.

The first message includes auxiliary positioning information and location request information, the auxiliary positioning information is used by the terminal to perform positioning measurement, and the location request information is used to request obtaining of a positioning result of the positioning measurement.

Figure 25:
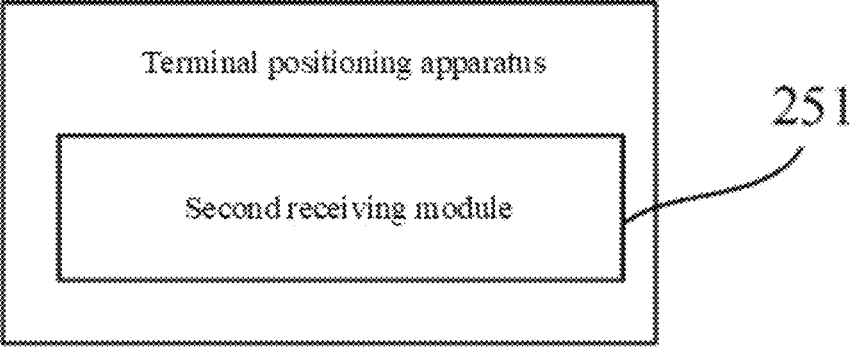
FIG. 25 is a schematic diagram of an apparatus for positioning a terminal provided by an example of the disclosure.

As shown in FIG. 25, an example of the disclosure provides a terminal positioning apparatus, performed by a terminal and including a second receiving module 251.

The second receiving module 251 is configured to receive a positioning message.

The positioning message includes auxiliary positioning information and location request information, the auxiliary positioning information is used by the terminal to perform positioning measurement, and the location request information is used to request obtaining of a positioning result of the positioning measurement.

An example of the disclosure further provides a communication device, including:

an antenna;

a memory; and a processor, connected with the antenna and the memory respectively and configured to, by executing an executable program stored on the memory, control the antenna to send and receive a wireless signal and be capable of executing steps of a wireless network access method provided by any one of the above examples.

The communication device provided by the present example may be the above terminal or base station. The terminal may be various human-mounted terminals or vehicle-mounted terminals. The base station may be various types of base stations, for example, 4G base station or 5G base station.

The antenna may be various types of antennas, for example, 3G antenna, 4G antenna, 5G antenna and other mobile antennas. The antenna may further include a WiFi antenna or a wireless charging antenna.

The memory may include various types of storage media, and the storage media may be a non-transitory computer storage medium and can continuously memorize information stored on the memory after the communication device has a power failure.

The processor may be connected with the antenna and the memory through a bus and the like and configured to read the executable program stored on the memory, for example, at least one method shown in any one example of the disclosure.

An example of the disclosure further provides a non-transitory computer readable storage medium. The non-transitory computer readable storage medium stores an executable program. The executable program, when executed by a processor, implements steps of a terminal positioning method provided by any above example, for example, at least one method shown in any example of the disclosure.

As shown in FIG. 26, an example of the disclosure provides a structure of a terminal.

Referring to FIG. 26, the present example provides a terminal 800. The terminal may be specifically a mobile phone, a computer, a digital broadcast terminal, a messaging device, a game console, a tablet device, a medical device, a fitness device, a personal digital assistant and the like.

Referring to FIG. 26, the terminal 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the terminal 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the terminal 800. Examples of these data include instructions of any application program or method for operation on the terminal 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the terminal 800. The power component 806 may include a power management system, one or more power sources, and other components related to power generation, management and distribution for the terminal 800.

The multimedia component 808 includes a screen which provides an output interface between the terminal 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the terminal 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the terminal 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the terminal 800. For example, the sensor component 814 may detect a start/shut-down state of the terminal 800 and relative positioning of the components, for example, the components are a display and a keypad of the terminal 800. The sensor component 814 may further detect location change of the terminal 800 or one component of the terminal 800, whether there is contact between the user and the terminal 800, azimuth or speed up/speed down of the terminal 800 and temperature change of the terminal 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and other devices. The terminal 800 may access a wireless network based on a communication standard, such as Wi-Fi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the terminal 800 may be implemented by one or more than one application specific integrated circuit (ASIC), digital signal processor (DSP), digital signal processing device (DSPD), programmable logic device (PLD), field-programmable gate array (FPGA), controller, micro control unit, microprocessor or other electronic elements for executing the above method.

In an example, a non-transitory computer-readable storage medium including instructions is further provided, such as a memory 804 including the instructions. The above instructions may be executed by a processor 820 of a terminal 800 so as to complete the above method. For example, the non-transitory computer-readable storage medium may be an ROM, a random access memory (RAM), a CD-ROM, a magnetic tape, a floppy disk, an optical data storage device and the like.

The terminal may be configured to implement the above method, for example, the method of any one example of the disclosure.

As shown in FIG. 27, an example of the disclosure provides a structure of a base station. For example, the base station 900 may be provided as a network side device. Referring to FIG. 27, the base station 900 includes a processing component 922 which further includes one or more processors and a memory resource represented by a memory 932, configured to store an instruction capable of being executed by the processing component 922, for example, an application program. The application program stored in the memory 932 may include one or more modules, each of which corresponds to a set of instructions. Besides, the processing component 922 is configured to execute an instruction so as to execute the above method, namely, any aforementioned method, for example, the method of any example of the disclosure.

The base station 900 may also include a power component 926 configured to execute power management of the base station 900, a wired or wireless network interface 950 configured to connect the base station 900 to a network, and an input/output (I/O) interface 958. The base station 900 can operate an operating system stored in the memory 932, for example, Windows Server™, Mac OS X™, Unix™, Linux™, FreeBSD™, or the like.

The wireless network interface 950 includes but is not limited to an antenna of the above communication device. Those skilled in the art will easily figure out other implementation solutions of the disclosure after considering the specification and practicing the disclosure disclosed here. The disclosure intends to cover any transformation, application or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It should be understood that the disclosure is not limited to an accurate structure described above and shown in the accompanying drawings, and various modifications and changes can be made without departing from its scope. The scope of the disclosure is limited merely by appended claims.

According to an aspect of the disclosure, a terminal positioning method is provided, performed by a core network element and including:

sending a first message to be used by a terminal to perform positioning.

The first message includes auxiliary positioning information and location request information; the auxiliary positioning information is used by the terminal to perform positioning measurement; and the location request information is used to request obtaining of a positioning result of the positioning measurement.

In an example, the first message is a new radio positioning protocol a (NRPPa) message; and sending the first message to be used by the terminal to perform positioning includes:

sending, to a base station, the new radio positioning protocol a (NRPPa) message to be used for performing positioning on the terminal.

In an example, the first message is a long-term evolution positioning protocol (LPP) message; and sending the first message to be used by the terminal to perform positioning includes:

sending, to the terminal, the long-term evolution positioning protocol (LPP) message to be used for performing positioning on the terminal.

In an example, the method further includes:

sending, to the base station, a new radio positioning protocol a (NRPPa) message, in which the new radio positioning protocol a (NRPPa) message includes measurement gap information; and the measurement gap information is used by the base station to determine a measurement gap of the positioning measurement of the terminal.

In an example, the method further includes:

receiving a long-term evolution positioning protocol (LPP) message carrying the positioning result and sent by the terminal based on the location request information;

or, receiving a new radio positioning protocol a (NRPPa) message carrying the positioning result and sent by the base station based on the location request information.

According to an aspect of the disclosure, a terminal positioning method is further provided, performed by a base station and including:

receiving a first message sent by a core network element and to be used by a terminal to perform positioning.

The first message includes auxiliary positioning information and location request information; the auxiliary positioning information is used by the terminal to perform positioning measurement; and the location request information is used to request obtaining of a positioning result of the positioning measurement.

In an example, the first message is a new radio positioning protocol a (NRPPa) message.

In an example, the method further includes:

sending, to the terminal, a radio resource control (RRC) message determined based on the new radio positioning protocol a (NRPPa) message, in which the radio resource control (RRC) message includes the auxiliary positioning information and the location request information.

In an example, the auxiliary positioning information is generated based on auxiliary positioning information in the new radio positioning protocol a (NRPPa) message; and the location request information is generated based on location request information in the new radio positioning protocol a (NRPPa) message.

In an example, the radio resource control (RRC) message further carries a measurement gap of the positioning measurement of the terminal, in which the measurement gap is determined based on a positioning manner of the positioning measurement of the terminal indicated by the location request information or based on measurement gap information.

In an example, the method further includes:

receiving a radio resource control (RRC) message carrying the positioning result and sent by the terminal based on the location request information; and sending, to the core network element, a new radio positioning protocol a (NRPPa) message carrying the positioning result, in which the new radio positioning protocol a (NRPPa) message is determined according to the RRC message.

In an example, the method further includes:

receiving the new radio positioning protocol a (NRPPa) message sent by the core network element, in which the new radio positioning protocol a (NRPPa) message includes measurement gap information; and the measurement gap information is used by the base station to determine a measurement gap of the positioning measurement of the terminal.

According to an aspect of the disclosure, a terminal positioning method is further provided, performed by a terminal and including:

receiving a positioning message.

The positioning message includes auxiliary positioning information and location request information; the auxiliary positioning information is used by the terminal to perform positioning measurement; and the location request information is used to request obtaining of a positioning result of the positioning measurement.

In an example, receiving the positioning message includes:

receiving a first message sent by a core network element.

In an example, the first message is a long-term evolution positioning protocol (LPP) message.

In an example, the method further includes:

receiving a radio resource control (RRC) message sent by a base station.

The radio resource control (RRC) message carries a measurement gap of the positioning measurement of the terminal.

In an example, receiving the positioning message includes:

receiving a second message sent by a base station.

In an example, the second message is a radio resource control (RRC) message.

In an example, the radio resource control (RRC) message further carries a measurement gap of the positioning measurement of the terminal.

In an example, the method further includes:

performing the positioning measurement on a positioning reference signal according to the auxiliary positioning information, the location request information and the measurement gap to obtain the positioning result.

In an example, the method further includes:

sending, to a base station, a radio resource control (RRC) message carrying the positioning result based on the location request information;

or, sending, to a core network element, a long-term evolution positioning protocol (LPP) message carrying the positioning result based on the location request information.

According to an aspect of the disclosure, a terminal positioning apparatus is further provided, performed by a core network element and including a first sending module, in which the first sending module is configured to send a first message to be used by a terminal to perform positioning; and the first message includes auxiliary positioning information and location request information, the auxiliary positioning information is used by the terminal to perform positioning measurement, and the location request information is used to request obtaining of a positioning result of the positioning measurement.

According to an aspect of the disclosure, a terminal positioning apparatus is further provided, performed by a base station and including a first receiving module, in which the first receiving module is configured to receive a first message sent by a core network element and to be used by a terminal to perform positioning; and the first message includes auxiliary positioning information and location request information, the auxiliary positioning information is used by the terminal to perform positioning measurement, and the location request information is used to request obtaining of a positioning result of the positioning measurement.

According to an aspect of the disclosure, a terminal positioning apparatus is further provided, performed by a terminal and including a second receiving module, in which the second receiving module is configured to receive a positioning message; and the positioning message includes auxiliary positioning information and location request information, the auxiliary positioning information is used by the terminal to perform positioning measurement, and the location request information is used to request obtaining of a positioning result of the positioning measurement.

According to an aspect of the disclosure, a communication device is further provided and includes:

an antenna;

a memory; and a processor, connected with the antenna and the memory respectively and configured to, by executing an executable program stored on the memory, control the antenna to send and receive a wireless signal and be capable of executing steps of the method provided by any one of above technical solutions.

According to an aspect of the disclosure, a non-transitory computer readable storage medium is further provided and stores computer executable instructions, in which the computer executable instructions, after being executed by a processor, can implements steps of the method provided by any one of above technical solutions.

What is claimed is:

1. A terminal positioning method, performed by a core network element and comprising:

sending, to a terminal, messages to be used by the terminal to perform positioning, wherein the messages comprise positioning assistance information and location request information; the positioning assistance information is used by the terminal to perform positioning measurement; and the location request information is used to request a positioning result of the positioning measurement;

wherein the positioning assistance information indicates at least one of: precision information of a positioning reference signal (PRS) sent by a base station, height information of a launching point of sending the PRS by the base station, or a time-frequency domain location for the base station to send the PRS; and sending, to the base station, a new radio positioning protocol a (NRPPa) message, wherein the NRPPa message comprises information related to a measurement gap, and the information related to the measurement gap is used by the base station to determine the measurement gap of the positioning measurement of the terminal.

2. The method according to claim 1, wherein the messages are NRPPa messages; and sending the messages to be used by the terminal to perform the positioning comprises:

sending, to the base station, the NRPPa messages to be used by the terminal to perform the positioning.

3. The method according to claim 1, wherein the messages are long-term evolution positioning protocol (LPP) messages; and sending the messages to be used by the terminal to perform the positioning comprises:

sending, to the terminal, the LPP messages to be used by the terminal to perform the positioning.

4. The method according to claim 1, further comprising:

receiving a long-term evolution positioning protocol (LPP) message carrying the positioning result sent by the terminal based on the location request information; or, receiving an NRPPa message carrying the positioning result sent by the base station based on the location request information.

5. A communication device, comprising:

an antenna;

a memory; and a processor, connected with the antenna and the memory respectively and configured to, by executing computer executable instructions stored on the memory, control the antenna to send and receive a wireless signal and be capable of implementing the method provided according to claim 1.

6. A terminal positioning method, performed by a base station and comprising:

receiving messages sent by a core network element and to be used by a terminal to perform positioning, wherein the messages comprise positioning assistance information and location request information; the positioning assistance information is used by the terminal to perform positioning measurement; and the location request information is used to request a positioning result of the positioning measurement;

wherein the positioning assistance information indicates at least one of: precision information of a positioning reference signal (PRS) sent by the base station, height information of a launching point of sending the PRS by the base station, or a time-frequency domain location for the base station to send the PRS; and receiving a new radio positioning protocol a (NRPPa) message sent by the core network element, wherein the NRPPa message comprises information related to a measurement gap, and the information related to the measurement gap is used by the base station to determine the measurement gap of the positioning measurement of the terminal.

7. The method according to claim 6, wherein the messages are NRPPa messages.

8. The method according to claim 7, further comprising:

sending, by the base station and to the terminal, a radio resource control (RRC) message determined based on the NRPPa messages, wherein the RRC message comprises the positioning assistance information and the location request information.

9. The method according to claim 8, wherein the positioning assistance information is generated based on positioning assistance information in the NRPPa messages; and the location request information is generated based on location request information in the NRPPa messages.

10. The method according to claim 8, wherein the RRC message further carries the measurement gap of the positioning measurement of the terminal, and the measurement gap is determined based on the positioning method of the positioning measurement of the terminal indicated by the location request information or determined based on the information related to the measurement gap.

11. The method according to claim 6, further comprising:

receiving, by the base station, a radio resource control (RRC) message sent by the terminal based on the location request information and carrying the positioning result; and sending, by the base station and to the core network element, an NRPPa message carrying the positioning result, wherein the NRPPa message is determined according to the RRC message.

12. A communication device, comprising:

an antenna;

a memory; and a processor, connected with the antenna and the memory respectively and configured to, by executing computer executable instructions stored on the memory, control the antenna to send and receive a wireless signal and be capable of implementing the method provided according to claim 6.

13. A terminal positioning method, performed by a terminal and comprising:

receiving messages, wherein the messages comprise positioning assistance information and location request information; the positioning assistance information is used by the terminal to perform positioning measurement; and the location request information is used to request a positioning result of the positioning measurement;

wherein the positioning assistance information indicates at least one of: precision information of a positioning reference signal (PRS) sent by a base station, height information of a launching point of sending the PRS by the base station, or a time-frequency domain location for the base station to send the PRS; and a measurement gap of the positioning measurement of the terminal is determined by the base station according to information related to the measurement gap, and the information related to the measurement gap is comprised in a new radio positioning protocol a (NRPPa) message sent by a core network element to the base station.

14. The method according to claim 13, wherein receiving the messages comprises:

receiving messages sent by the core network element, wherein the messages are long-term evolution positioning protocol (LPP) messages; and wherein the method further comprises: receiving, by the terminal, a radio resource control (RRC) message sent by the base station, wherein the RRC message carries the measurement gap of the positioning measurement of the terminal.

15. The method according to claim 13, wherein receiving the messages comprises:

receiving a second message sent by the base station, wherein the second message is a radio resource control (RRC) message;

wherein the RRC message further carries the measurement gap of the positioning measurement of the terminal.

16. The method according to claim 14, further comprising:

performing, by the terminal, the positioning measurement on a positioning reference signal according to the positioning assistance information, the location request information and the measurement gap to obtain the positioning result.

17. The method according to claim 13, further comprising:

sending, to the base station, a radio resource control (RRC) message carrying the positioning result based on the location request information;

or sending, to the core network element, a long-term evolution positioning protocol (LPP) message carrying the positioning result based on the location request information.

18. A communication device, comprising:

an antenna;

a memory; and a processor, connected with the antenna and the memory respectively and configured to, by executing computer executable instructions stored on the memory, control the antenna to send and receive a wireless signal and be capable of implementing the method provided according to claim 13.

* * * * *